(12) United States Patent
Menard et al.

(10) Patent No.: US 8,553,865 B2
(45) Date of Patent: Oct. 8, 2013

(54) MULTI-POINT TO MULTI-POINT INTERCOM SYSTEM

(75) Inventors: Stephane Menard, St-Bruno (CA); Ulrich Pauler, Montreal (CA); Martin Lamothe, Laprairie (CA); Cliff Emerson, St-Bruno (CA); Barthelemy Rolet, Montreal (CA)

(73) Assignee: Clear-Com Research, Inc., St-Bruno (Quebec) (CA)

( * ) Notice: Subject to any disclaimer, the term of this patent is extended or adjusted under 35 U.S.C. 154(b) by 926 days.

(21) Appl. No.: 12/670,875

(22) PCT Filed: Jul. 22, 2008

(86) PCT No.: PCT/CA2008/001351
§ 371 (c)(1),
(2), (4) Date: Jan. 27, 2010

(87) PCT Pub. No.: WO2009/015460
PCT Pub. Date: Feb. 5, 2009

(65) Prior Publication Data
US 2010/0246788 A1    Sep. 30, 2010

Related U.S. Application Data

(60) Provisional application No. 60/935,148, filed on Jul. 27, 2007.

(51) Int. Cl.
*H04M 1/00*    (2006.01)
(52) U.S. Cl.
USPC ...... 379/159; 379/158; 379/202.01; 370/260; 348/14.09

(58) Field of Classification Search
USPC ........... 370/260; 348/14.09; 379/202.01, 158, 379/159
See application file for complete search history.

(56) References Cited

U.S. PATENT DOCUMENTS

| | | | |
|---|---|---|---|
| 6,466,550 B1 | 10/2002 | Foster et al. | |
| 6,888,935 B1 | 5/2005 | Day | |
| 7,233,580 B2 | 6/2007 | Moss et al. | |
| 7,313,593 B1 | 12/2007 | Pulito et al. | |
| 8,334,891 B2 * | 12/2012 | Graham et al. | 348/14.09 |
| 2003/0125954 A1 | 7/2003 | Bradley et al. | |
| 2004/0213402 A1 | 10/2004 | Ruetschi | |
| 2005/0008024 A1 * | 1/2005 | Newpol et al. | 370/401 |
| 2005/0041603 A1 * | 2/2005 | Tighe et al. | 370/260 |
| 2005/0076081 A1 | 4/2005 | Rui et al. | |
| 2006/0050658 A1 | 3/2006 | Shaffer et al. | |
| 2008/0084831 A1 | 4/2008 | Sylvain | |

FOREIGN PATENT DOCUMENTS

| | | |
|---|---|---|
| WO | 0072560 A1 | 11/2000 |
| WO | 2004049683 A2 | 6/2004 |
| WO | 2004081805 A1 | 9/2004 |
| WO | 2006116750 A2 | 11/2006 |

* cited by examiner

*Primary Examiner* — Simon King
(74) *Attorney, Agent, or Firm* — Pillsbury Winthrop Shaw Pittman LLP

(57) ABSTRACT

A multi-point to multi-point intercom system, formed by at least one intercom server and a plurality of intercom terminals, the intercom terminals registered as talking or listening intercom terminals in an intercom session table. The intercom server sends to listening intercom terminals some or all of the unmixed audio packets received by talking intercom terminals according to the intensity signal value found in the header of the unmixed audio packets.

10 Claims, 43 Drawing Sheets

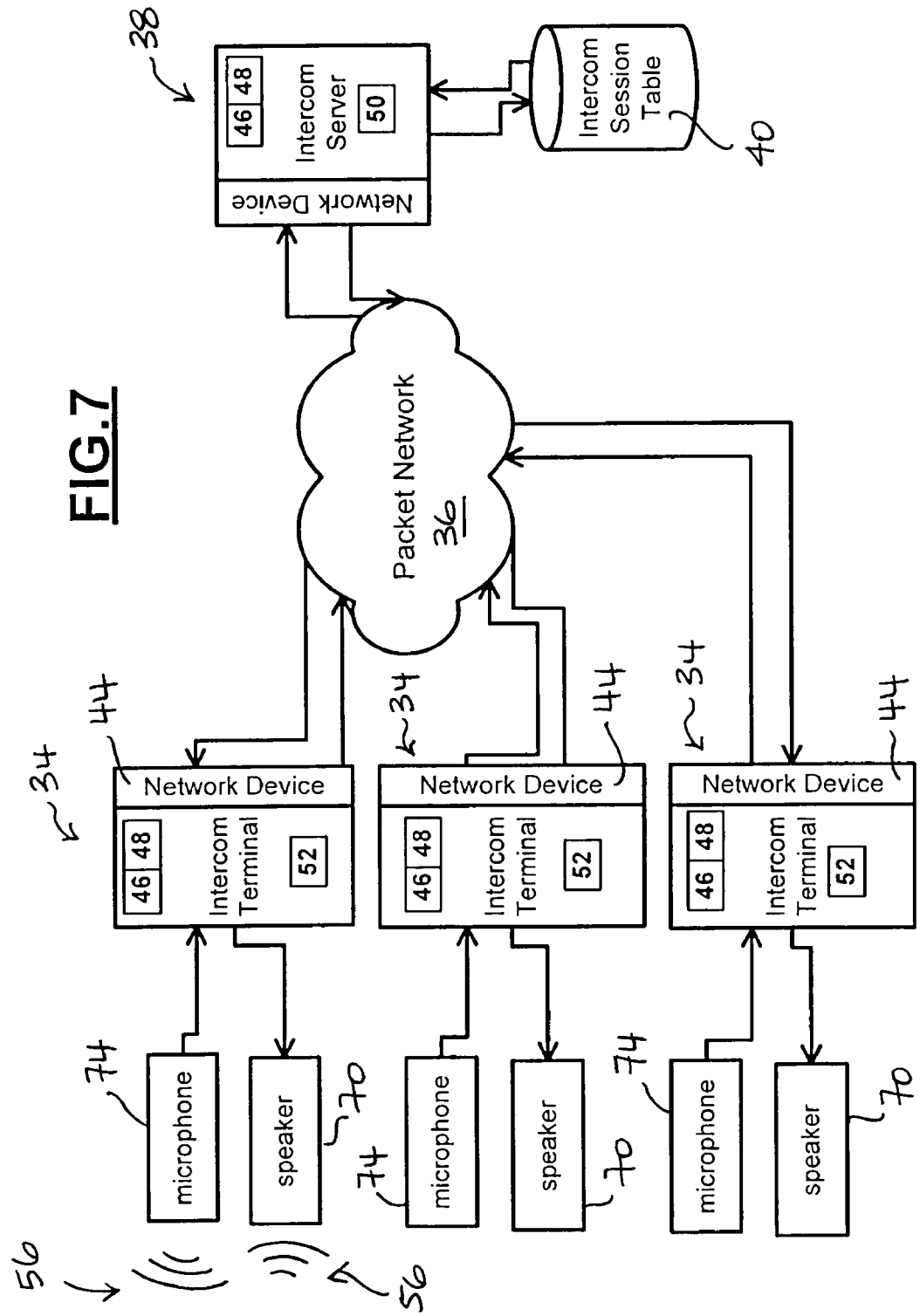

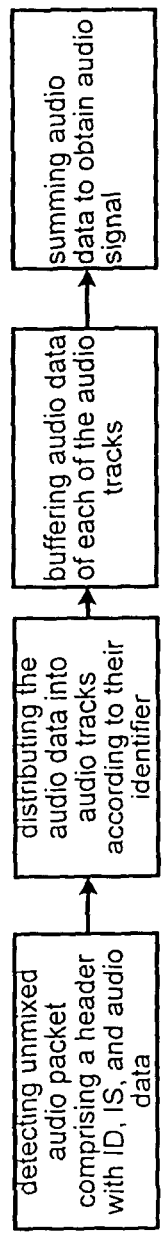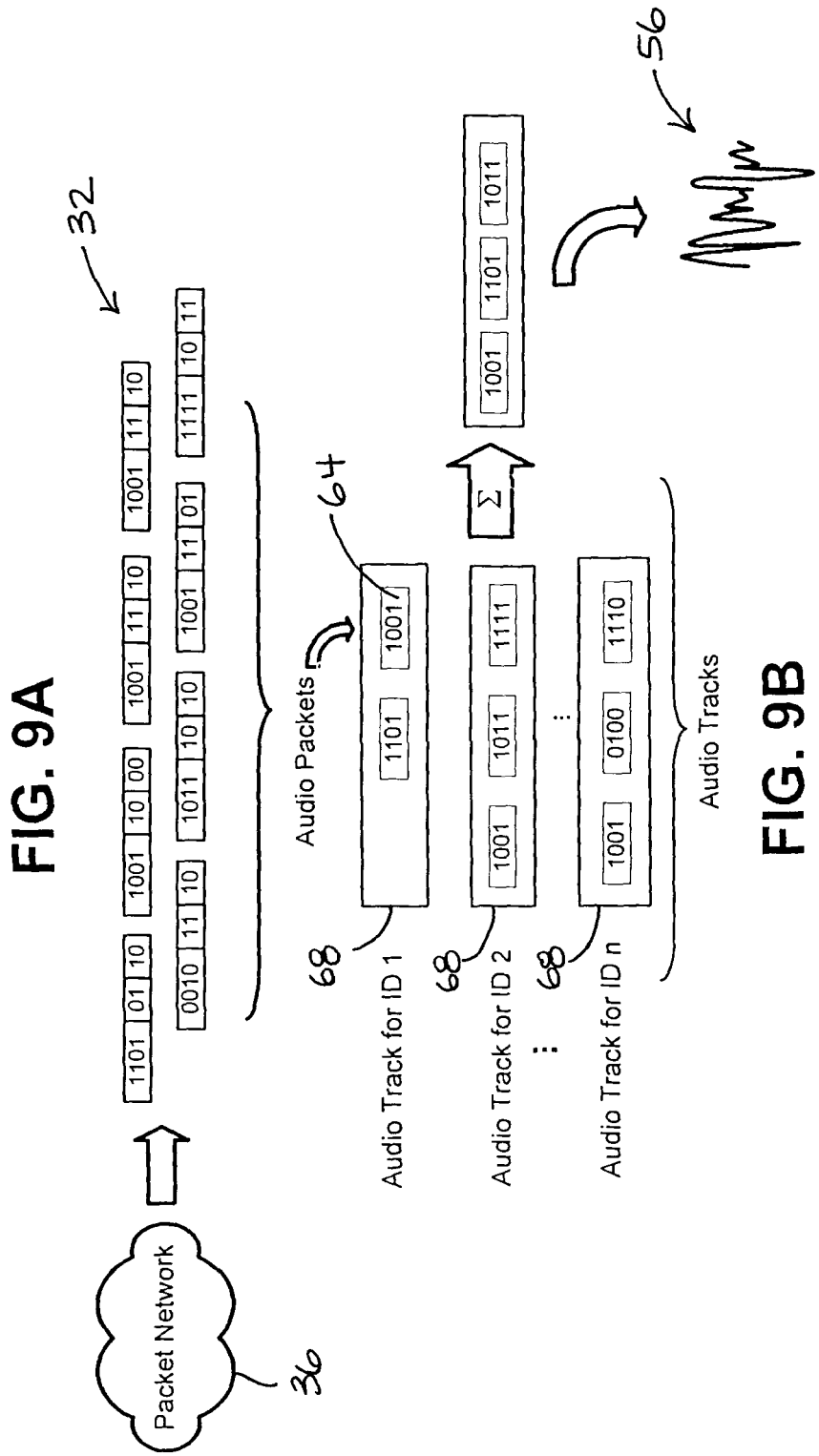

FIG. 13
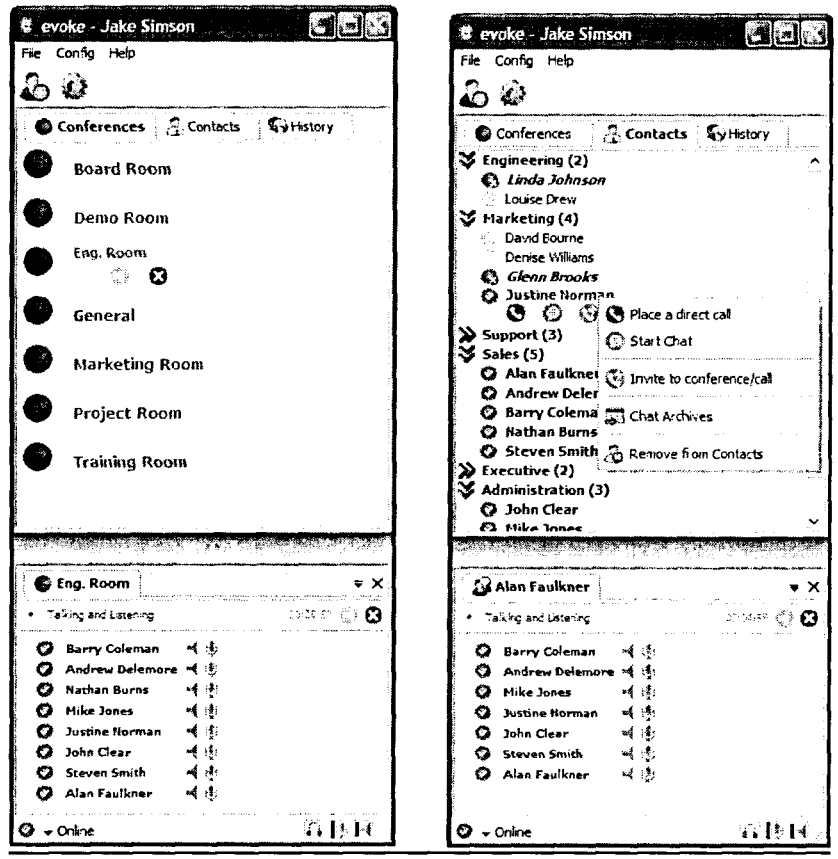
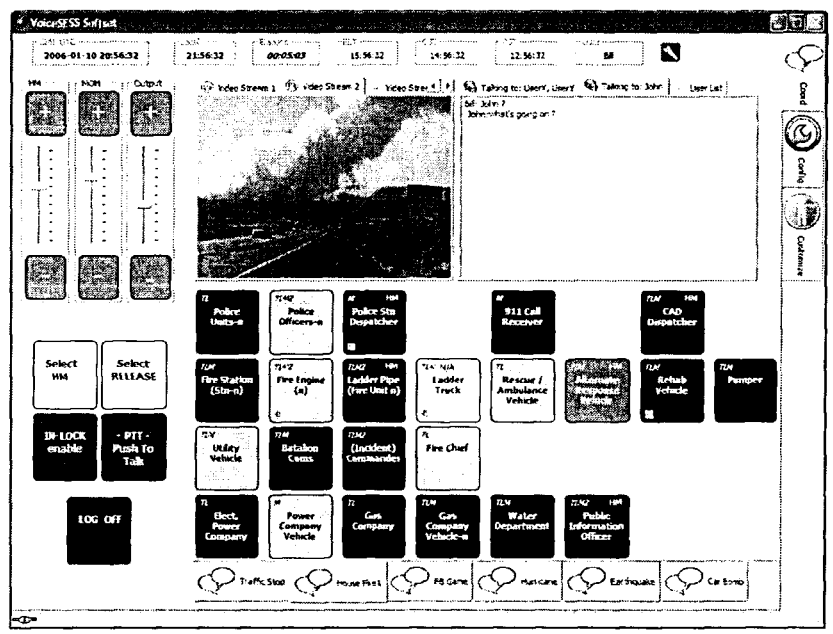

FIG. 27

Overlap FEC code

|  |  | AxB | BxC | CxD | DxE | ExF | FxG | GxH |
|---|---|---|---|---|---|---|---|---|
| A | B | C | D | E | F | G | H | I |

- Bandwidth: ~200% of original source stream
- Minimum delay: 1T
- Maximum delay: 3T
- Delay steps:
    o 1T always (!) when loosing 1 packet
    o 3T when loosing 2 consecutive packets
    o 1T when loosing every 2$^{nd}$ packet
- Maximum consecutive loss: 2 packets
- Maximum average loss (theoretically): 50%

FIG. 28

Scaling Example for Overlap FEC Code No.1

|   |   |   |   | AxC | BxD | CxE | DxF | ExG |
|---|---|---|---|-----|-----|-----|-----|-----|
|   |   | AxB | BxC | CxD | DxE | ExF | FxG | GxH |
| A | B | C | D | E | F | G | H | I |

- Bandwidth: ~300% of original source stream
- Minimum delay: 1T
- Maximum delay: 5T
- Delay steps:
    - 1T (only!) when loosing 1 packet
      e.g. recovery if D gets lost (when E has arrived):
      D = CxD x C
    - 2T (only!) when loosing 2 consecutive packets
      e.g. recovery if D, E get lost (when F has arrived):
      D = BxD x B
      E = D x DxE
    - 4T when loosing 3 consecutive packets
      e.g. recovery if D, E, F get lost (when G, H have arrived):
      F = FxG x G
      E = F x ExF
      D = F x DxF
    - 5T when loosing 4 consecutive packets
      e.g. recovery if D, E, F, G get lost (when H, I have arrived):
      G = GxH x H
      F = G x FxG
      E = G x ExG
      D = F x DxF
    - 1T when loosing every 2$^{nd}$ packet
- Maximum consecutive loss: 4 (!!) packets
- Maximum average loss (theoretically): 66% (!!)

FIG. 29

Scaling Example for Overlap FEC Code No.2

|   |   |   |   |   |   | AxD | BxE | CxF |
|---|---|---|---|---|---|-----|-----|-----|
|   |   |   |   | AxC | BxD | CxE | DxF | ExG |
|   |   | AxB | BxC | CxD | DxE | ExF | FxG | GxH |
| A | B | C | D | E | F | G | H | I |

- Bandwidth: ~400% of original source stream
- Minimum delay: 1T
- Maximum delay: 7T
- Delay steps:
    o 1T (only!) when loosing 1 packet
       e.g. recovery if D gets lost (when E has arrived): see above
    o 2T (only!) when loosing 2 consecutive packets
       e.g. recovery if D, E get lost (when F has arrived): see above
    o 3T (only!) when loosing 3 consecutive packets
       e.g. recovery if D, E, F get lost (when G has arrived):
       D = AxD x A
       E = CxE x C
       F = E x ExF
    o 5T when loosing 4 consecutive packets
       e.g. recovery if D, E, F, G get lost (when H, I have arrived): see above
    o 6T when loosing 5 consecutive packets
       e.g. recovery if C, D, E, F, G get lost (when H, I have arrived):
       G = GxH x H
       F = G x FxG
       E = G x ExG
       D = F x DxF
       C = F x CxF
    o 7T when loosing 6 consecutive packets
       e.g. recovery if B, C, D, E, F, G get lost (when H, I have arrived):
       G = GxH x H
       F = G x FxG
       E = G x ExG
       D = F x DxF
       C = F x CxF
       B = E x BxE
    o 1T when loosing every 2$^{nd}$ packet
- Maximum consecutive loss: 6 (!!!!) packets
- Maximum average loss (theoretically): 75% (!!!!)

FIG. 30

Creation of a Multi-Track stream

2-Packet Recovery for Single-Track transmissions

1-Packet Recovery for Single-Track transmissions

Offset based 2-Packet Recovery for Multi-Track transmissions

Offset based 1-Packet Recovery Schema 4

Offset based 1-Packet Recovery Schema 3

Offset based 1-Packet Recovery Schema 1

Offset based 1-Packet Recovery Schema 2

Recovery Process – Overview

FIG. 42

1-Packet Recovery Algorithm
Schema 1 offset = i;

cnt = nLayersConf;
cnt > 0;
cnt--;

((offset - 2*cnt) >= 0)
&&
(history[offset - cnt] == NULL)
&&
(history[offset - 2*cnt][cnt] != NULL)
&&
(history[offset][0] != NULL)

TRUE / FALSE history[offset - cnt][0] = history[offset - 2*cnt][cnt]

<XOR> history[offset][0]

continue;

recoveredFrames++;

framesMissing--;

FIG. 43

1-Packet Recovery Algorithm
Schema 2 offset = i;

cnt = 1;
(cnt <= nLayersConf) && (offset - cnt >= 0) && (offset + cnt < historySize);
cnt++;

(history[offset + cnt] == NULL)
&&
(history[offset - cnt][cnt] != NULL)
&&
(history[offset][0] != NULL)

TRUE

FALSE history[offset + cnt][0] = history[offset - cnt][cnt]

<XOR> history[offset][0]

continue;

recoveredFrames++;

framesMissing--;

MULTI-POINT TO MULTI-POINT INTERCOM SYSTEM

CROSS-REFERENCE TO RELATED APPLICATIONS

This application is a National Stage of International patent application PCT/CA2008/001351, filed on Jul. 22, 2008, which claims priority to U.S. provisional patent application 60/935,148, filed on Jul. 27, 2007.

FIELD OF THE INVENTION

The present invention relates to intercom systems and more particularly concerns an intercom system formed by at least one intercom server and a plurality of intercom terminals for allowing intercom terminals to exchange unmixed audio packets over a packet network, each of the unmixed audio packet having audio data and a header, the header having an intercom terminal identifier and an intensity signal value representative of the audio data.

BACKGROUND OF THE INVENTION

In prior art intercom or conferencing systems, audio signals travelling between each endpoint and the intercom server are represented as channels. Each endpoint traditionally carries one channel of audio to the server as well as receives one channel of audio from the server.

Channelizing audio in a conferencing system causes the need to mix all active participants of the conference before transmitting the audio to each endpoint. For an intercom system for which each endpoint have the flexibility to decide who they are listening or talking to, the mixing is very computing intensive as each channel will have completely different listening experience. To provide such flexibility in a traditional intercom system, each participant's audio channel must be present at the server at all times and thus imposing hard limits of the number of endpoints rather quickly.

A side effect of mixing is the addition of extra propagation delay. In order to mix audio, all channels must be timed together which means in packet based system such as IP, the need for jitter buffers at the server. Moreover, mixing can only be done using linear non encoded signals, meaning that all signals must be decoded before being mixed and then re-encoded after mixing, thus degrading substantially the quality of the signal.

Referring now to FIG. 1, as an example, a conference bridge topology 3, will require each conference participant 5 to send its unidirectional audio stream to a local conferencing bridge 7. The local conference bridge 7 will provide each participant 5 as well as other connected conference bridges 7 with their own audio mix composed of all participants 5. This topology 3 is bandwidth efficient as only one egress and one ingress signal needs to be sent to each participant 5. This topology 1 however requires lots of expensive processing resources at the bridge 7 to provide instant and dynamic multi conferencing capability. For example, as shown in FIG. 1, supposing that Participant F leaves the conference but that Participant A wishes to continue to listen to participant F in parallel with the conference, Conference Bridge 2 would have to send Participant F's audio to Conference Bridge 1.

The resulting audio signal for each participant 5 is a composite sum of signals provided by each party forming the union of the conference being monitored. For each audio signal arriving at the conference bridge 7, the following tasks must be performed: a) decompressing the signal; b) calculating the composite sum of all parties being monitored; and c) recompressing the resulting signal.

The significant amount of computational resources necessary to mix and compress lowers the total number of possible participants 5 available on one conference bridge 7 and degrades voice quality.

Due to the packet based nature of the transmission, it is necessary to do jitter buffering at the conference bridge 7 to align all audio signals before they are mixed which increases communication delays significantly.

Referring to FIG. 2, in another example, there is shown a simple traditional system with three endpoints 9, sending audio from "endpoint 1" and "endpoint 3" to be received by "endpoint 2". The three endpoints 9 are connected to a traditional intercom server 11. As shown, "endpoint 1" and "endpoint 3" have to encode their audio before sending to the server 11. The traditional intercom server 11 receives the audio and needs to do jitter reducing calculations to time all channels together.

The intercom server 11 then decodes the audio and mixes it together. The result mix is then recompressed and forwarded to "endpoint 2". "Endpoint 2" then has to do jitter reducing calculations and decode before playback.

In addition to the deficiencies mentioned above, the endpoints 9 receiving the pre-mixed signal of all active participants have no mean to know at any given time the origin of the speech being received (ie: from which participants), and also has no means to perform signal processing on a participant basis such as volume adjustments for specific endpoints or also audio routing to different sound devices. For instance, for particular applications, it could be desirable to route the flight director speech to a loud speaker at a high volume while the rest of the participants are heard only through a headset.

It is also known in the art that peer to peer (P2P) topology, in a multi party voice conversation, will require a large amount of bandwidth since each party needs to send its unidirectional audio stream to all participants, and hence each party will receive the audio streams of all participants. A 3-party conference call would produce six unidirectional audio streams. It will also require that the participant device does local mixing of all incoming audio streams which will demand an increasing amount of resources as the conference gets larger. This topology is appropriate when operated over a private Local Area Network (LAN) but clearly becomes inefficient when crossing sub networks. It also provides capabilities such as selective listening and multi intercom session participations.

Known to the Applicant are the following U.S. patents and/or patent applications: U.S. Pat. Nos. 6,438,111 B1; 6,671,262 B1; 6,782,413 B1; 6,687,358 B1; 6,717,921 B1; 6,728,221 B1; 6,940,826; 6,956,828; 2005/0068904 A1; 2005/0122389 A1; 2005/0135280 A1; and 2006/0146737 A1.

None of the above-mentioned documents describes or suggests an intercom system that can balance bandwidth requirements against the need to provide the conference or intercom system participants with various intercom features, such as selective listening and multi conferencing, without degrading voice quality and increasing delay.

Hence, in light of the aforementioned, there is a need for an improved intercom system, which by virtue of its design and components, would be able to overcome some of the above-discussed prior art problems.

SUMMARY OF THE INVENTION

According to the present invention, there is provided a method performed at an intercom server of a multi-point to multi-point intercom system, the method comprising the following steps:

a) receiving unmixed audio packets during a given period of time, each of the unmixed audio packets having audio data and a header, said header comprising an intercom terminal identifier corresponding to an intercom terminal of the intercom system and an intensity signal representative of an intensity of the audio data contained in the corresponding unmixed audio packet;
b) upon reception of each of the unmixed audio packets of step a), identifying from an intercom session table at least one intercom session in which said intercom terminal of said packet is registered as a talker intercom terminal;
c) identifying for each of said at least one intercom session identified in step b), listening intercom terminals according to the intercom session table; and
d) for each of the listening intercom terminals identified in step c), sending those of said unmixed audio packets of step a) having the strongest intensity signals to said listening intercom terminal, up to a predetermined number of unmixed audio packets.

According to the present invention, there is also provided a method performed at an intercom terminal of a multi-point to multi-point intercom system comprising the steps of:
a) obtaining a unique intercom terminal identifier;
b) obtaining a list of available intercom sessions;
c) sending a request including said intercom terminal identifier to an intercom server of the intercom system to join at least one intercom session from the list of available intercom sessions;
d) detecting unmixed audio packets sent via the intercom server, each unmixed audio packet comprising:
    a header having an intercom terminal identifier associated with a participant of said at least one session; and
    audio data;
e) distributing the audio data into audio tracks according to their identifier;
f) buffering audio data of each of the audio tracks distributed in step e) during a buffering time interval; and
g) summing audio data of the tracks that have been buffered in step f) to obtain an audio signal.

According to the present invention, there is also provided a method performed at an intercom terminal of a multi-point to multi-point intercom system comprising the steps of:
a) obtaining a unique intercom terminal identifier;
b) obtaining a list of available intercom sessions;
c) sending a request including the intercom terminal identifier to the intercom server of the intercom system to join at least one intercom session from the list of available intercom sessions;
d) capturing an audio signal from a capture device during a predetermined time interval;
e) measuring an intensity of the audio signal to obtain an intensity signal;
f) creating an audio packet comprising:
    a header having the intercom terminal identifier and the intensity signal; and
    audio data derived from the audio signal; and
g) sending the audio packet to an intercom server of the intercom system.

According to the present invention, there is also provided an intercom server of a multi-point to multi-point intercom system, comprising:
an intercom session table linking registered intercom terminals and intercom sessions;
means for receiving unmixed audio packets during a given period of time, each of the unmixed audio packets having audio data and a header, said header comprising an intercom terminal identifier corresponding to one of said registered intercom terminals of the intercom system and an intensity signal representative of an intensity of the audio data contained in the corresponding unmixed audio packet;
first means for identifying from the intercom session table, upon reception of each of the unmixed audio packets received by the means for receiving, at least one of the intercom sessions in which the intercom terminal associated with said packet is registered as a talker intercom terminal;
second means for identifying, for each of said at least one intercom session identified by the first means for identifying, intercom terminals registered as listening intercom terminals according to the intercom session table; and
means for sending, for each of the listening intercom terminals identified by the second means for identifying, those of said unmixed audio packets received by the means for receiving having the strongest intensity signals to said listening intercom terminal, up to a predetermined number of unmixed audio packets.

According to the present invention, there is also provided an intercom terminal of a multi-point to multi-point intercom system, comprising:
means to obtain a unique intercom terminal identifier;
means to obtain a list of available intercom sessions;
means for sending a request to an intercom server of the intercom system to join at least one intercom session from the list of available intercom sessions;
means for detecting unmixed audio packets sent via the intercom server, each unmixed audio packet comprising:
    a header having an intercom terminal identifier associated with a participant of said at least one session; and
    audio data;
means for distributing the audio data into audio tracks according to their identifier;
means for buffering audio data of each of the audio tracks distributed by the means for distributing; and
means for summing audio data of the tracks that have been buffered by the means for buffering to obtain an audio signal.

According to the present invention, there is also provided an intercom terminal of a multi-point to multi-point intercom system, comprising:
means for obtaining a unique intercom terminal identifier;
means for obtaining a list of available intercom sessions;
means for sending a request including the intercom terminal identifier, to an intercom server of the intercom system to join at least one intercom session from the list of available intercom sessions;
means for capturing an audio signal from a capture device during a predetermined time interval;
means for measuring an intensity of the audio signal to obtain an intensity signal;
means for creating an audio packet comprising:
    a header having the intercom terminal identifier and the intensity signal; and
    audio data derived from the audio signal; and
means for sending the audio packet to an intercom server of the intercom system.

BRIEF DESCRIPTION OF THE DRAWINGS

FIG. 7 shows a simplified schematic view of an intercom system with an intercom server and several intercom terminals, according to another embodiment of the invention.

FIG. 9A shows a functional block diagram of a method performed at an intercom terminal for receiving unmixed audio packets.

FIG. 9B shows a simplified schematic view of the operations shown in FIG. 9A

FIG. 13 shows an intercom terminal interface according to an embodiment of the invention, for managing intercom sessions and digital processing performed on audio signals sent and received.

FIG. 27 shows a schematic view of an example of an overlap FEC code.

FIG. 28 shows a schematic view of an example of Scaling Overlap FEC.

FIG. 29 shows a schematic view of another example of Scaling Overlap FEC.

FIG. 30 shows an example of a creation of a Multi-Track stream.

FIG. 42 shows an Offset based 1-Packet Schema 3 recovery algorithm, Algorithm of 1-Packet Recovery Schema 1.

FIG. 43 shows an Offset based 1-Packet Schema 1 recovery algorithm, Algorithm of 1-Packet Recovery Schema 2.

DESCRIPTION OF PREFERRED EMBODIMENTS

Figure 1:
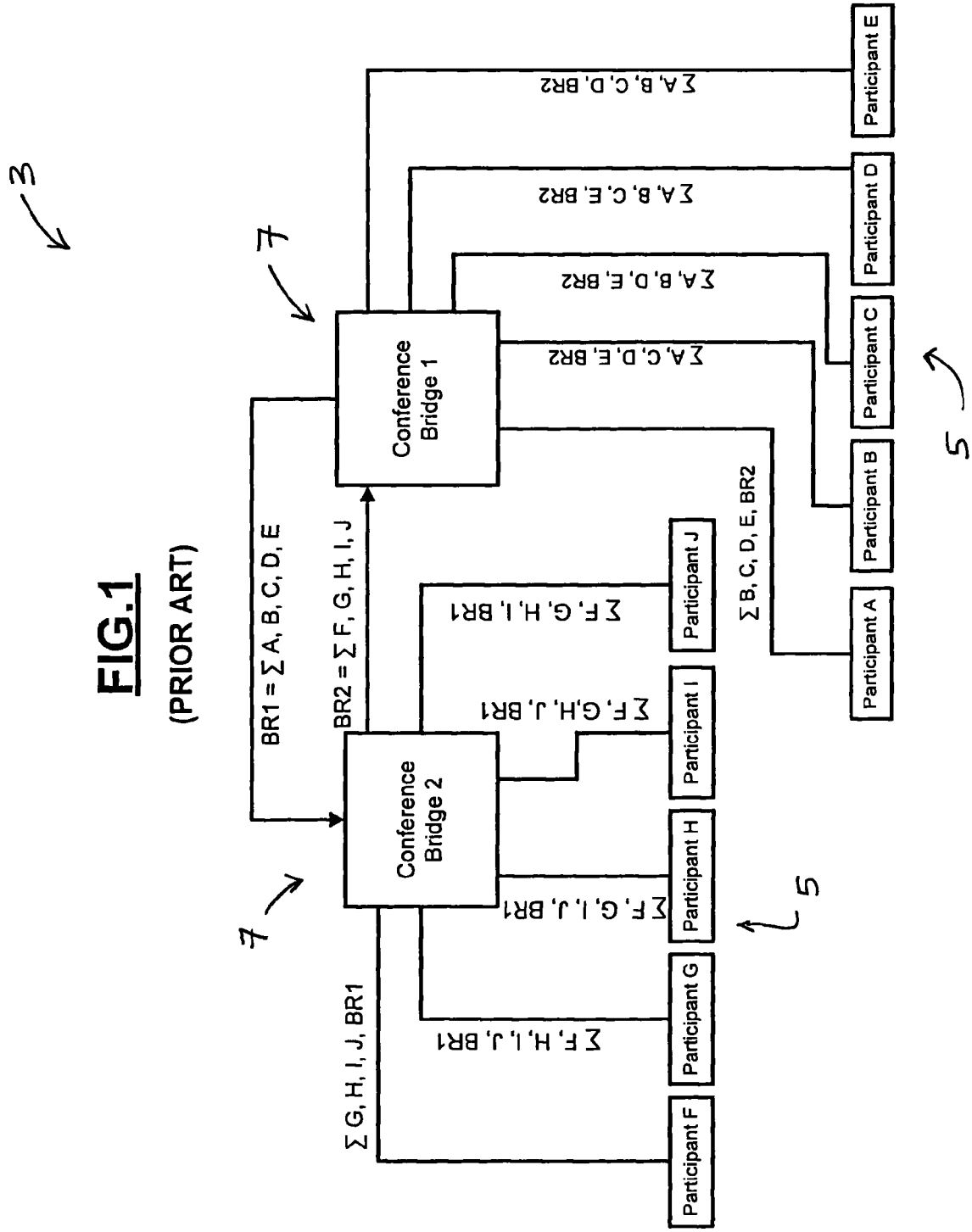
FIG. 1 (PRIOR ART) shows a logical block diagram illustrating a typical prior art conference bridge system.
Figure 2:
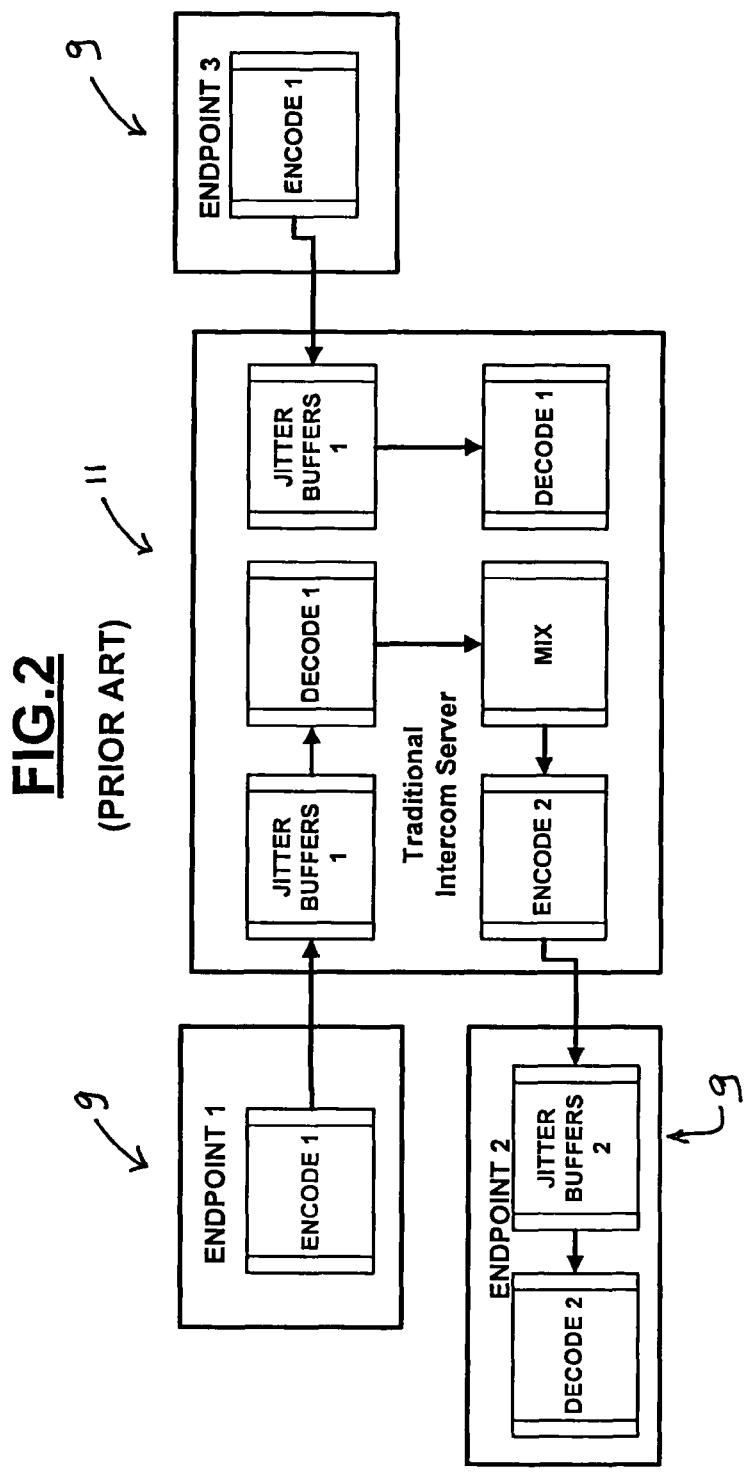
FIG. 2 (PRIOR ART) shows a logical block diagram illustrating an example of a traditional intercom system with three endpoints.
Figure 3:
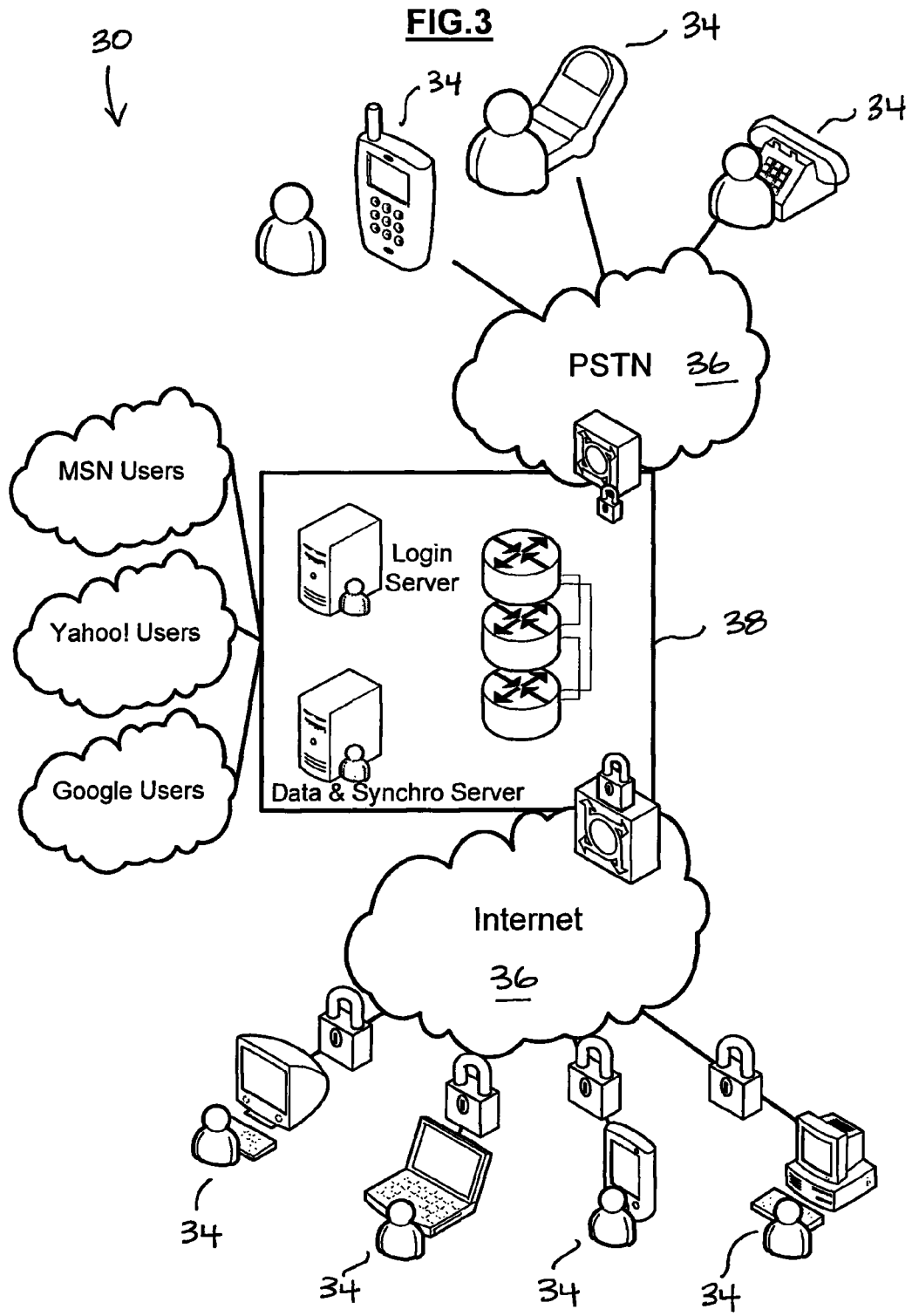
FIG. 3 shows a schematic view of an intercom system with an intercom server and several intercom terminals, according to an embodiment of the invention.
Figure 4:
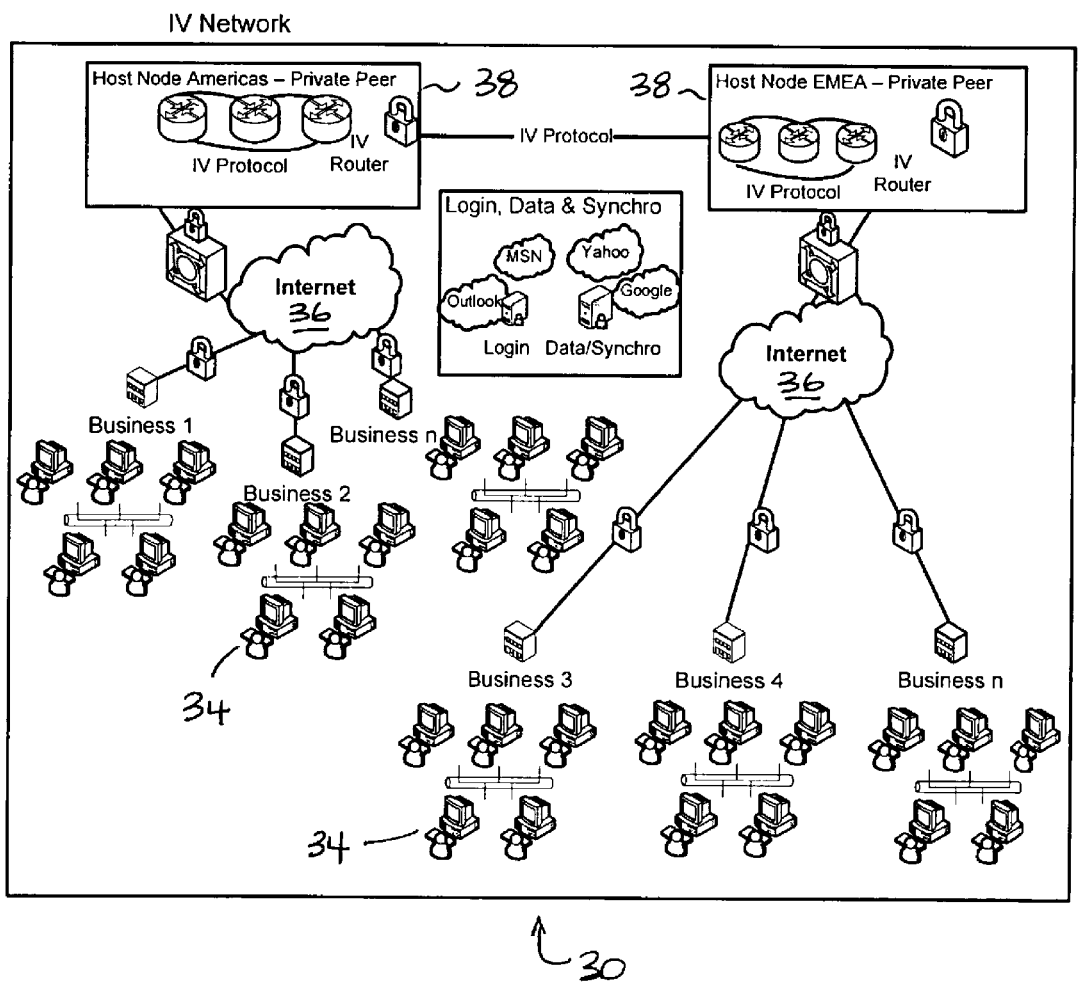
FIG. 4 shows a schematic view of intercom system with two intercom servers and several intercom terminals, according to another embodiment of the invention.
Figure 5:
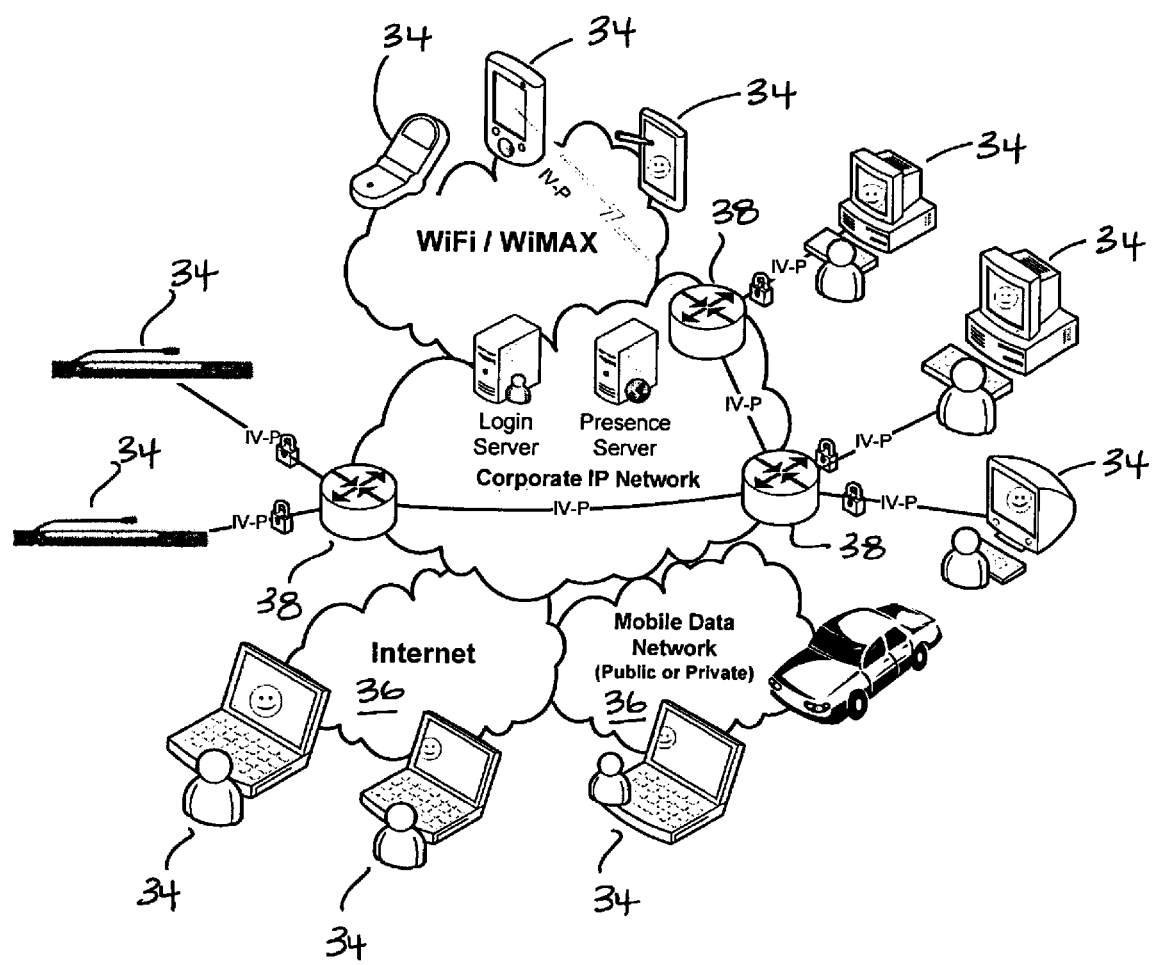
FIG. 5 shows a schematic view of an intercom system with three intercom server and several intercom terminals, according to yet another embodiment of the invention, where a wireless network is used to exchange unmixed audio packets between intercom terminals.
Figure 6:
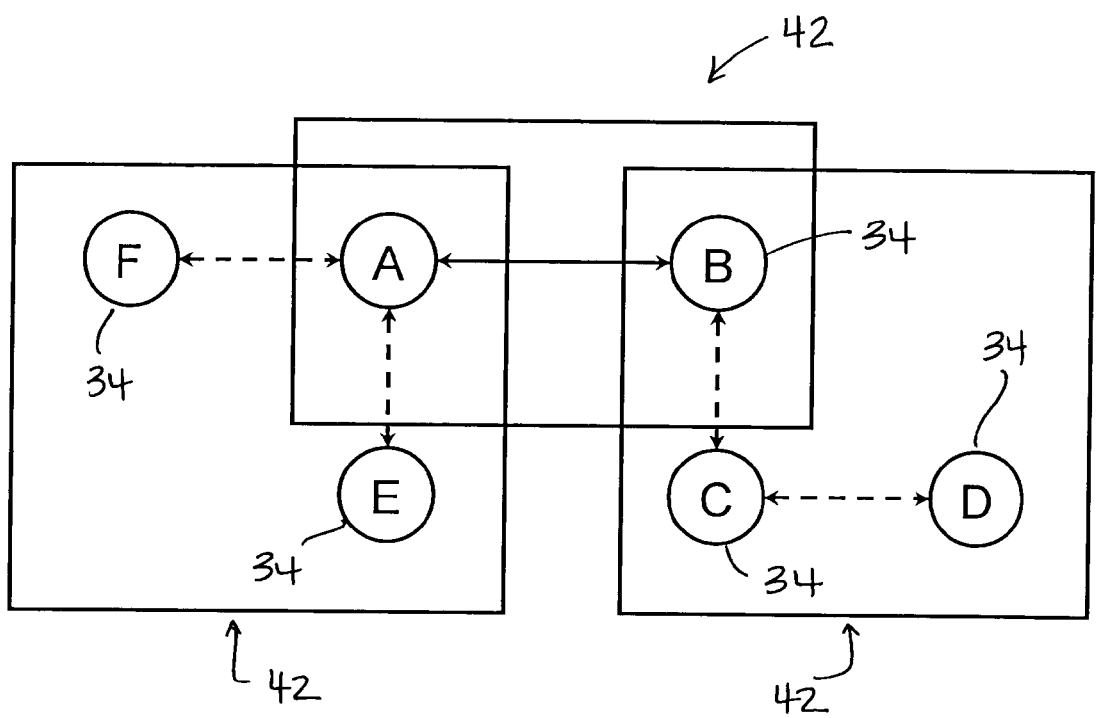
FIG. 6 shows a simplified schematic view of two intercom terminals A and B participating to several intercom sessions.
Figure 8A:
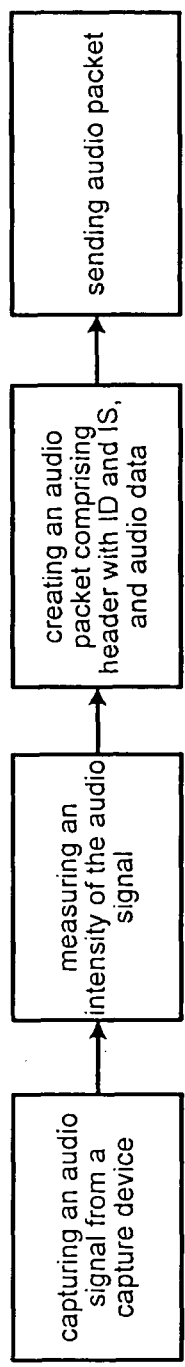
FIG. 8A shows a functional block diagram of a method performed at an intercom terminal for sending unmixed audio packets.
Figure 8B:
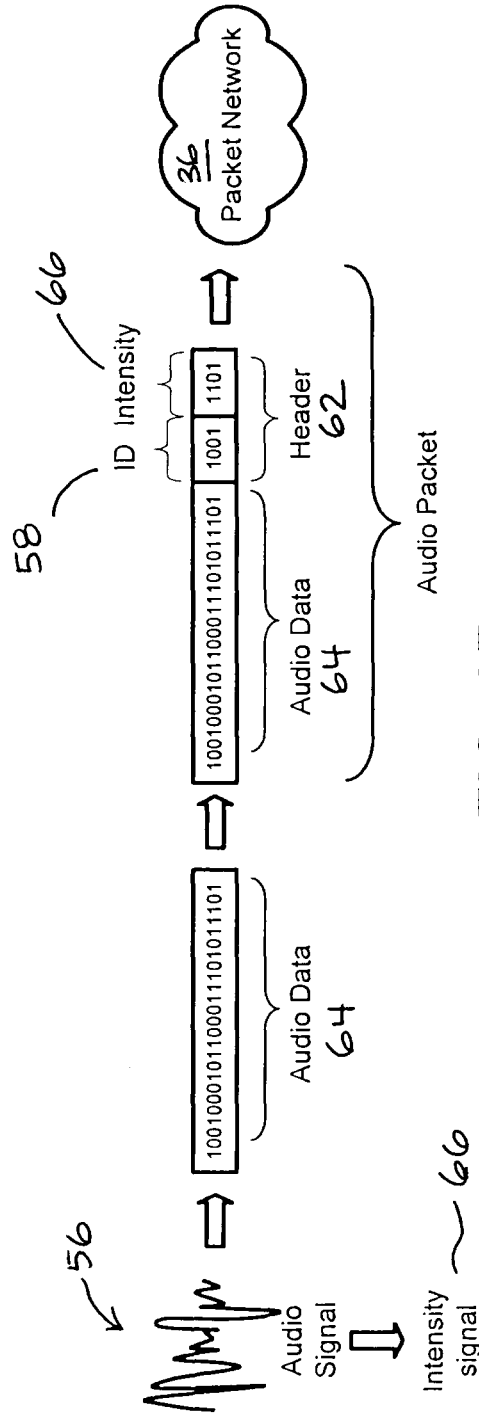
FIG. 8B shows a simplified schematic view of the operations shown in FIG. 8A.
Figures 10A, 10B:
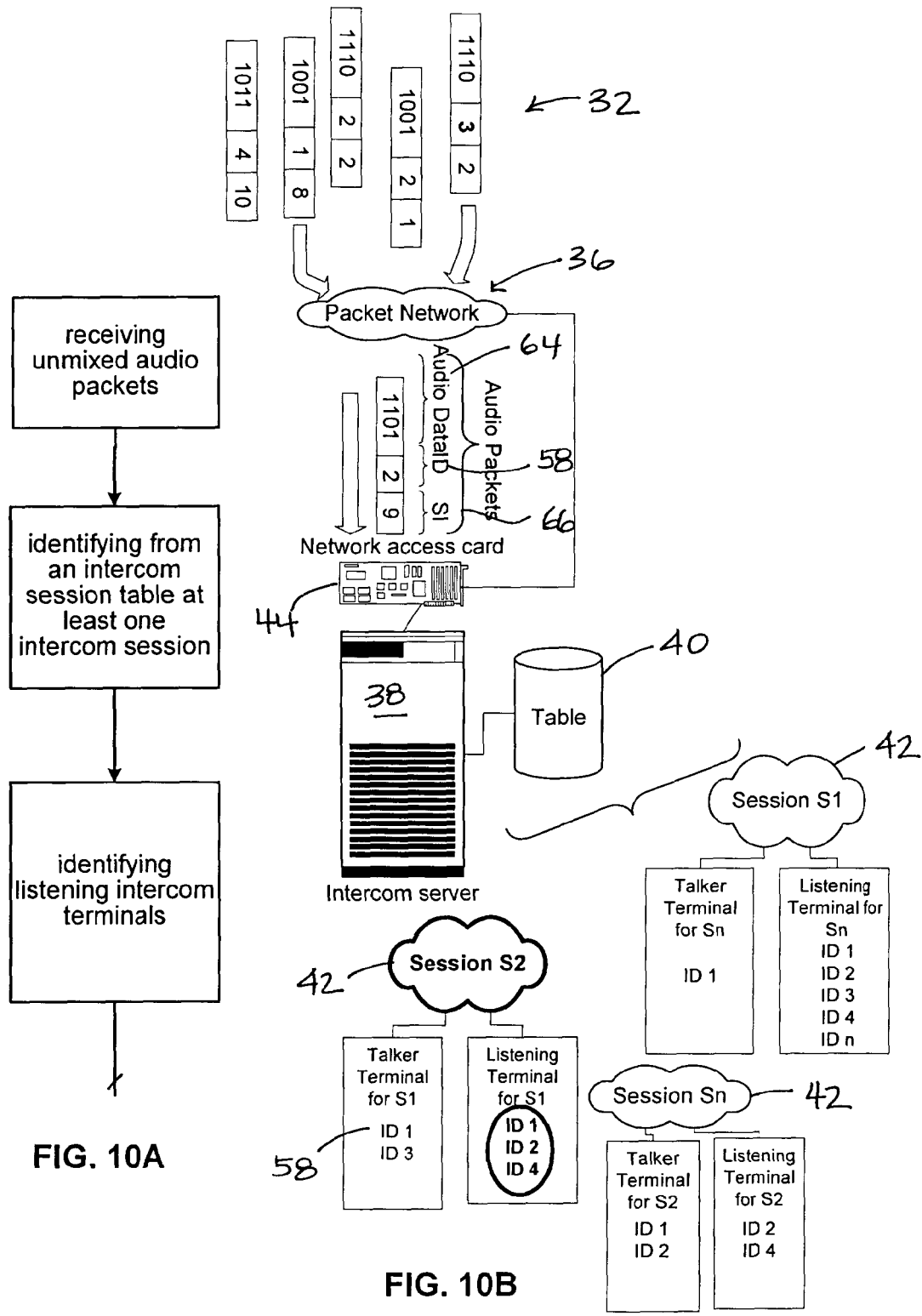
FIGS. 10A and 11A show a functional block diagram of a method performed at an intercom server for receiving and selectively sending unmixed audio packets, FIG. 11A being the continuation of FIG. 10A.
FIGS. 10B and 11B show a simplified schematic view of the operations shown in FIGS. 10A and 11A, FIG. 11B being the continuation of FIG. 10B.
Figures 11A, 11B:
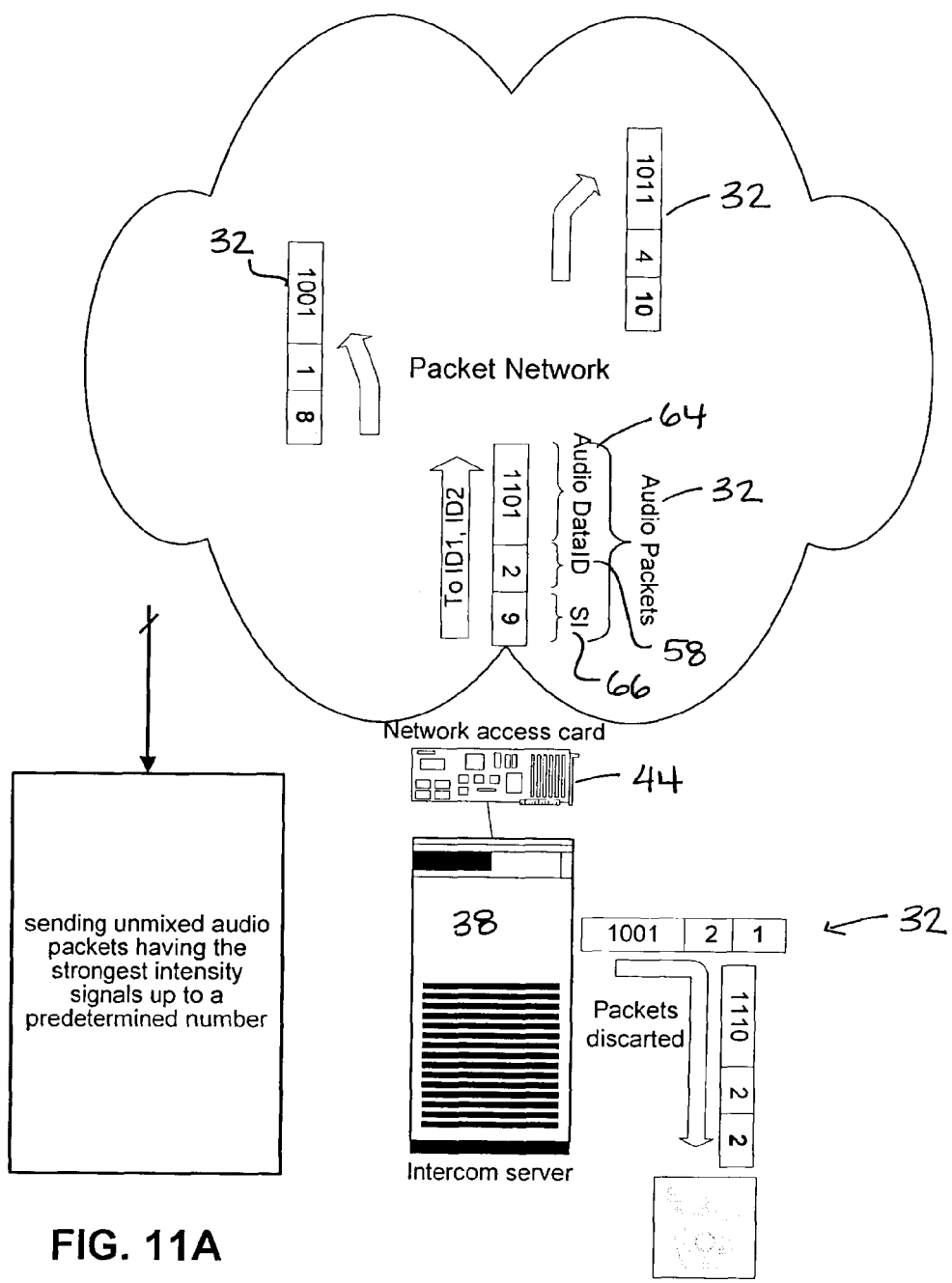

In the following description, similar features in the drawings have been given similar reference numerals. To preserve the clarity of the drawings, some references numerals have been omitted, if they were already identified in a preceding figure.

In the context of the present description, the expressions "conferencing" and "intercom system" include all types of communications or exchanges of information between a plurality of parties. Although the present invention was primarily designed for a global real-time conferencing and intercom technology over packet networks, it may be used for other kinds of applications, as apparent to a person skilled in the art. For this reason, the expression "global", "real-time" or "packets" should not be taken as to limit the scope of the present invention and includes all other kinds of applications or items with which the present invention may be used and could be useful.

Moreover, in the context of the present description, the expressions "system" and "technology", "network" and "system", "conferencing", "communication" and "exchange", as well as any other equivalent expressions and/or compound words thereof, may be used interchangeably. The same applies for any other mutually equivalent expressions, such as "web" and "net"; "endpoint", "intercom terminal" and "intercom client" or "conference call" and "intercom session", for example, as apparent to a person skilled in the art.

In addition, although the preferred embodiment of the present invention as illustrated in the accompanying drawings comprises various components, etc., and although the preferred embodiment of the conferencing system and corresponding features of the present invention as shown consists of certain configurations as explained and illustrated herein, not all of these components and configurations are essential to the invention and thus should not be taken in their restrictive sense, i.e. should not be taken as to limit the scope of the present invention. It is to be understood, as also apparent to a person skilled in the art, that other suitable components and cooperations thereinbetween, as well as other suitable configurations may be used for the conferencing system and corresponding network according to the present invention, as will be briefly explained herein and as can be easily inferred herefrom by a person skilled in the art, without departing from the scope of the invention.

Non-blocking multi-party conversation means that all speaking participant within a conference, group or party line will be heard by anybody listening to them. This type of communication is referred to as intercom technology, and differs from typical conference bridge, ie: all clients are not necessarily participating in the same conference. For instance, in a simple system of 5 people A, B, C, D and E, A could be listening to B and C, while B is listening to A, C, D and E.

In conversations involving more than two people, there are times when more than one person is speaking at a given moment. If all audio packets from the speaking participants were simply sent to all listening destinations, the bandwidth to each client would rise linearly as the number of speaker rises to possibly unsustainable numbers.

The concept of intensity based routing uses speech statistics and human ear perception to make intelligent decision on whether or not a packet should be dropped or forwarded to a client. Intensity based routing forwards only the X loudest packets in a given small time frame, where X is a configurable number typically between 3 and 7. In an intercom world, the X loudest packets can be different for each client and so the selection must be done for each connection independently.

The result of intensity based routing is a lower bandwidth to each client without affecting the non-blocking and multi-party aspects of the system by allowing the intercom server to drop packets when it thinks that the person at the other end will not be able to distinguish the drop. If a packet contains 20 ms of audio and the algorithm time span is also 20 ms, and we want to send the 3 most intense packets maximum, than the bandwidth to each client will never reach more than 3 packets per 20 ms periods. This will cap the output bandwidths to 3× the incoming stream. If at a given point in time, more than 3 participants are actively producing speech, the 20 ms resulting mix of the 3 most intense signals during the same 20 ms of time is noisy enough that adding more less intense signals to it will not make much difference to the human ear.

Referring to FIGS. 3 to 7, the present invention concerns methods and apparatus to be used in a multi-point to multi-point intercom system 30 where unmixed audio packets 32 are exchanged between intercom terminals 34 over a packet-based network 36, wired or wireless, via an intercom server 38. Intercom systems 30 are formed by the interconnection of intercom terminals 34 and of at least one intercom server 38.

An intercom terminal 34 may be a personal computer, a phone, a PDA (personal digital assistant) or any other device that as a CPU 48 and a memory 46 to run an intercom terminal application 52. An intercom terminal also has a network device 44 to connect to the intercom server 38 via a packet-based network 36. The intercom terminal further has a capture device 74, such as a microphone to capture audio signals 56 and/or an audio device, such as a speaker 70, to emit audio signals 56, since when participating in an intercom session 42, a participant using an intercom terminal 34 may be a talking participant or a listening participant, or both.

Now referring to FIGS. 6, 7, 8A and 8B, and 20, 21 and 24, for participating as a registered talking intercom terminal 34 in an intercom session 42, the intercom terminal 34 must have means for obtaining a unique terminal identifier 58. Such means may be a network device 44, such a wired or wireless network card, and software modules, such as a presence module 101, an interface module 102 and a participant controller module 103, part of an intercom terminal application 52, stored in the terminal's memory 46 and running on its CPU 48.

Figure 14:
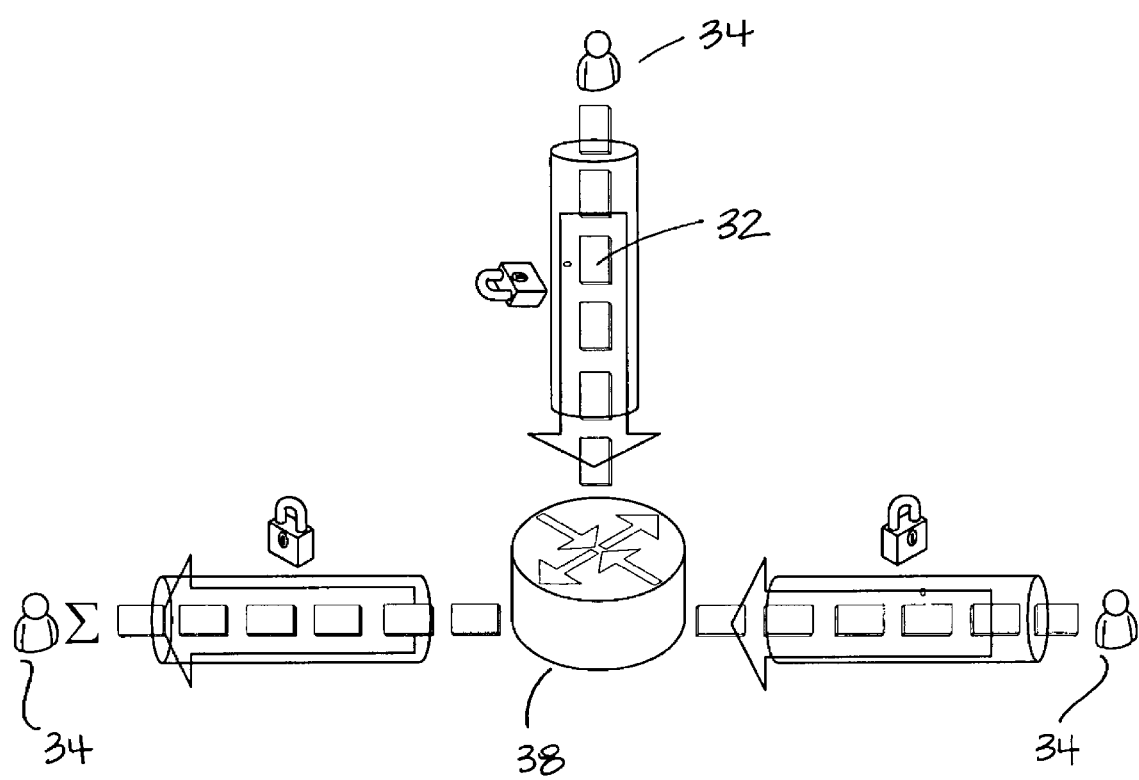
FIG. 14 shows a simplified schematic view of three intercom terminals exchanging unmixed audio packets via an intercom server using a secured connection.
Figure 15:
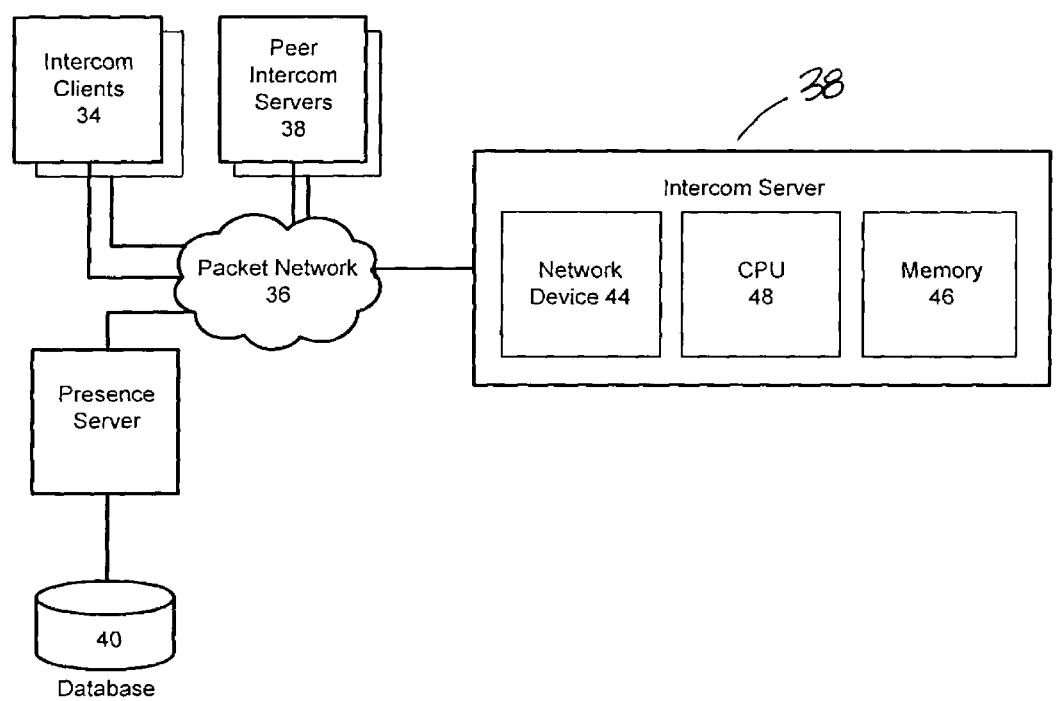
FIG. 15 shows a schematic view of an intercom system, with the intercom server's hardware.
Figure 16:
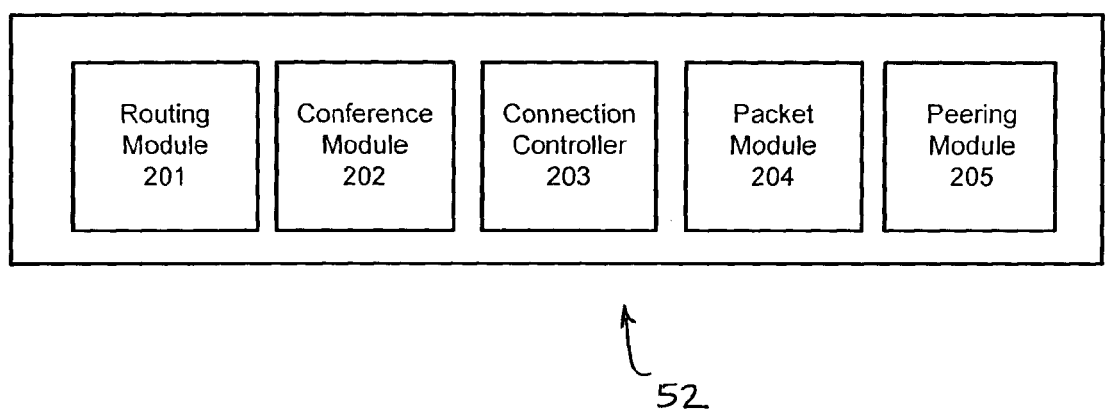
FIG. 16 shows the modules of an exemplary intercom server application.
Figure 17:
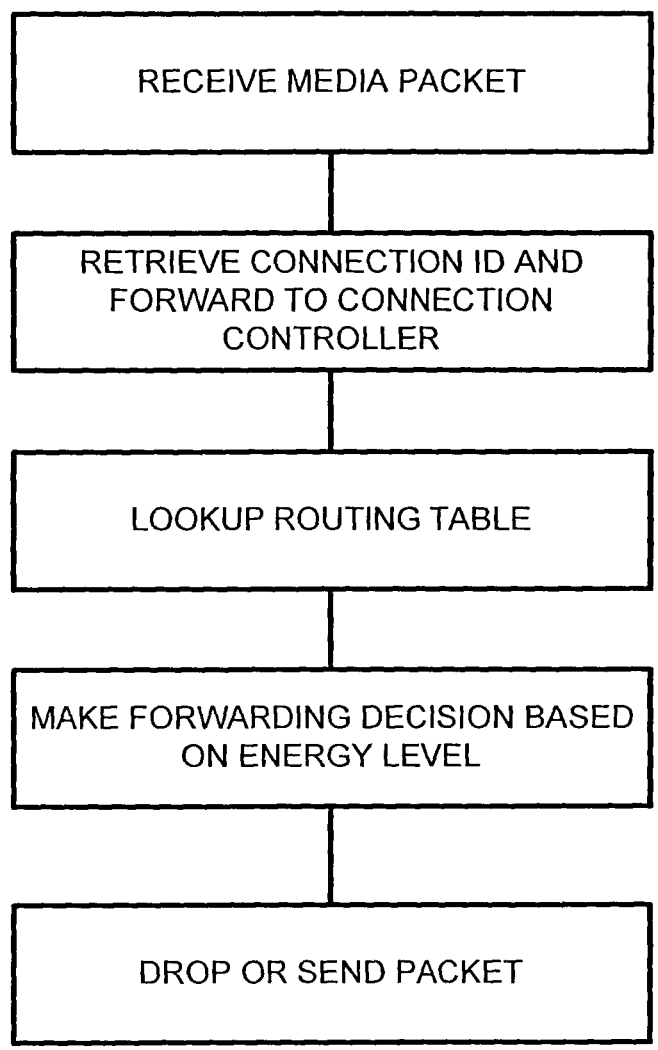
FIG. 17 shows a simplified sequence diagram of an audio routing process.

In other words, to connect to the intercom system 30, the intercom terminal 34 needs to authenticate its presence on the intercom system 30. In a preferred embodiment, the intercom terminal 34 obtains its unique terminal identifier 58, or its identification number, through a presence server 80, which is part of the intercom server but may not be physically on the same computer. The intercom terminal 34 may optionally obtain other information such as the interface server addresses and the intercom server address. The presence module 101 can use secure or non secure authentication methods (as shown in FIG. 14). In some configuration, one or more interface module 102 may send additional information to one or more interface server 78 to synchronize and enable extra service such as text messaging or video.

Once identified as a new unique participant on the intercom system 30, the intercom terminal 34 uses means for obtaining a list of available intercom sessions 42. The means for obtaining the list are a network device 44 and the presence 101, interface 102 and participant controller 103 modules part of the intercom terminal application. The intercom terminal 34 preferably obtains it from the presence server 80 connected to or embedded within the intercom server 38.

Once having the list of available sessions 42, the intercom terminal 34 needs means for sending a request, which includes its intercom terminal identifier 58, to the intercom server 38 to join at least one intercom session 42 from the list of available intercom sessions. The means for sending the request still may be the network device 44 and software modules part of the intercom terminal application 52. The intercom terminal 34 may register itself or be pre-registered on an intercom session table 40 as a talking intercom terminal, as a listening intercom terminal or as both a talking and listening intercom terminal. The intercom session list may be a database, and its objective is to link intercom sessions and intercom terminals, using the unique intercom terminal identifiers.

As explained above, if a participant wants to talk or send sound in an intercom session 42, the intercom terminal must send a request for joining a session 42 as a talking intercom terminal 34. The intercom terminal 34 may send requests for joining one, two or more sessions 42 at the same time.

It is the participants of the intercom system 30 that controls to which intercom sessions 42 they wish to participate to. Therefore, intercom terminals 34 preferably have means for sending other request to the intercom server to create an intercom session 42. The intercom terminal 34 uses these means, which may be a specific module of the intercom terminal application, when the intercom terminal wants to participate to an intercom session that does not exist yet. This also means that the list of available sessions requested by the intercom terminal may be an empty list in the case no intercom sessions are opened and available in the intercom system 30.

For allowing a participant to talk to other participants, the intercom terminal 34 must be provided with means for capturing an audio signal 56 from a capture device 74 during a predetermined time interval. This predetermined time interval may be from 1 to 250 ms, and is preferably from 5 to 20 ms, 20 ms corresponding to a typical packet size used with VoIP and similar derived protocols. In other words, the capture device 74, such as a microphone, periodically sends request for audio ready for read. For each request, the audio signal 56 is read from the capture device 74.

The intercom terminal is also provided with means for measuring the intensity of the audio signal means to obtain an intensity signal 66. In this embodiment, such means consist of an audio card, which samples the audio, and a packet module 104 part of the intercom terminal application, which calculates the mean intensity of the sampled audio to obtain the intensity of the audio signal.

The intercom terminal then uses its means for creating an audio packet. Each audio packet 32 contains a header 62 having the intercom terminal identifier 58 and the intensity signal 66; and audio data 64 derived from the audio signal 56. The means for creating the audio packet may be the packet module 104, part of the intercom terminal application 52.

The intercom terminal 34 is also provided with means for sending the audio packet 32 to an intercom server 38 of the intercom system 30. Such means may be an audio routing module 109 and the network device card 44. In other words, the level of the audio signal 56 within the packet 32 is calculated and the packet is tagged with the intensity signal 66. The packet 32 is then also tagged with the participant ID or intercom terminal identifier 58.

Preferably, the intercom terminal 34 is also provided with means for performing digital signal processing. Such means may be a DSP module 106 part of the intercom terminal application 52 that can perform optional adjustments such as noise cancellation, echo cancellation or automatic gain control before the audio packet is sent out to the intercom server 38.

Still preferably, the intercom terminal may be provided with means for encoding the audio signal. This means may consist of a coded module 107 part of the intercom terminal application 52. The audio is passed to the codec module 107 for being encoding by a primary codec.

Optionally, a second codec can be used to provide two copies of the same audio 56. This would allow intercom terminal 34 with a larger network bandwidth available to send in parallel a high bandwidth and high quality audio stream and a low bandwidth and lower quality stream to an intercom server 38. Other intercom terminals 34 connected to the intercom server 38 would then have the choice to receive only the lower bandwidth audio if they are connected on a low bandwidth network, without sacrificing audio quality for other intercom terminals 34 connected to a high bandwidth network.

Preferably, the header 62 of the audio packets 32 further have a priority indicator representative of the priority of the audio packet 32. In other words, a talking intercom terminal 34 may be attributed a priority level, and all the unmixed audio packets 32 sent by this terminal 34 would bare the priority level of their sender.

To recapitulate, the method for allowing a talker intercom terminal to participate in an intercom session involves the following steps:
a) obtaining a unique intercom terminal identifier;
b) obtaining a list of available intercom sessions;
c) sending a request including the intercom terminal identifier to the intercom server of the intercom system to join at least one intercom session from the list of available intercom sessions;
d) capturing an audio signal from a capture device during a predetermined time interval;
e) measuring an intensity of the audio signal to obtain an intensity signal;
f) creating an audio packet comprising:
   a header having the intercom terminal identifier and the intensity signal; and
   audio data derived from the audio signal; and
g) sending the audio packet to an intercom server of the intercom system.

Preferably, the predetermined time interval is from 1 ms to 250 ms. Still preferably, step g) further comprises a step of encoding the audio data prior to sending the audio packets and/or a step of performing digital processing on the audio data prior to sending the audio packets. Still preferably, the header of step f) further comprises a priority indicator representative of a priority of said audio packet.

Now referring to FIGS. 7, 10A and 10B, FIGS. 11A and 11B, and FIGS. 15 to 20, an intercom server 38 may be a dedicated server running an intercom server application 52 and having routing capabilities. It may also be a computer running the intercom server application 52 and connected to a router, a presence server 80 and an interface server 78. The intercom server 38 has at least a network device 44 for being connected through a packet-based network 36 to the intercom terminals 34. It must also have memory 46 to store the intercom server application and has a CPU (Central Processing Unit) 48 to run it 50.

The intercom server 38 has an intercom session table 40 linking registered intercom terminals 34 and intercom sessions 42. The intercom table 40 may be a list, a table, a series of interlinked tables or a database. It does not necessarily need to be stored on the same computer as the intercom server 38, but must be connected to it. As an example it can be stored in a dedicated database server and connected to the intercom server 38.

The intercom server also has means for receiving the unmixed audio packets 32 sent by the intercom terminals 34 during a given period of time, each of the unmixed audio packets 32 having, as explained above, audio data 64 and a header 62, said header having an intercom terminal identifier 58 corresponding to one of said registered intercom terminals 34 of the intercom system 30 and an intensity signal 66 representative of an intensity of the audio data 64 contained in the corresponding unmixed audio packet 32. The means for receiving the unmixed audio packets may be the network device 44 and modules part of the intercom server application, such as the routing 201 and peering 205 modules.

It must be understood that although the intercom server 38 receives unmixed audio packets 32 during a given period of time, the intercom server 38 does not retain any unmixed audio packet 32 received. In other words, each unmixed audio packet 32 received is processed upon reception at the intercom server 38.

The intercom server 38 is provided with first means for identifying from the intercom session table 40, upon reception of each of the unmixed audio packets 32 received by the means for receiving, at least one of the intercom sessions 42 in which the intercom terminal 34 associated with said packet 32 is registered as a talker intercom terminal 34. Such first means may be a conference module 202 and a connection controller module 203, part of the intercom server application 52.

The intercom server 38 is also provided with second means for identifying, for each of said at least one intercom session 42 identified by the first means for identifying, intercom terminals 34 registered as listening intercom terminals 34 according to the intercom session table 40. Again here, the second means may be the conference module 202 and connection controller module 203 part of the intercom server application.

In addition, it has means for sending, for each of the listening intercom terminals 34 identified by the second means for identifying, those of said unmixed audio packets 32 received by the means for receiving having the strongest intensity signals 66 to said listening intercom terminal 34, up to a predetermined number of unmixed audio packets 32. The means for deciding to send or discard the packets or for sending the selected packets may be the packet module 204 and the routing module 201 part of the intercom server application and a network device 44.

In other words, the intercom server 38 makes routing decision based primarily on the energy level or intensity signal 66 tagged in the packet 32 by the endpoint or intercom terminal 34 and has for goal to typically reduce the number of packets 32 sent, and hence reduce the bandwidth sent to each endpoint or intercom terminal 34 or peer intercom server 38. In fact, the human ear is only capable of distinguishing a few sources at any given time. As the time window shortens, it becomes possible to selectively remove low energy signals for this given time window without affecting the long term signal perception hear by a human being. For instance, a time window equivalent to the audio playback duration of a packet is a good choice, for example 20 ms. So for a given short time window, if for instance 10 participants area actively producing speech, the sum of the X most energetic signals, where X is less than 10, will perceptually sound the same as the sum of all 10. A good value for X is between 3 and 7.

Since the audio mixing is done by the endpoint 34 in the current invention, the connection controller 203 has to make choices whether a packet 32 is forwarded to a given endpoint 34 or peer 38 by keeping track of the energy level 66 of the packets 32 already sent to each connection, for a given time window. The process can use information such as other type of metadata to reinforce the selection. For instance, a signal priority tag could be inserted in the packets 32 to influence the forwarding selection.

Preferably, the intercom system 30 has one or more interface server (such as video server or instant messaging server) and a presence server 80, linked or part of the intercom server 58. Preferably, the intercom session table 40 is also be linked or include a database storing information such as names for users, conferences, fixed groups, party-lines, nodes or any other pertinent information is generally used. As mentioned earlier, the intercom session table 40 may contain only one session or one user, and may even be empty (or contain no session at all).

Figure 18:
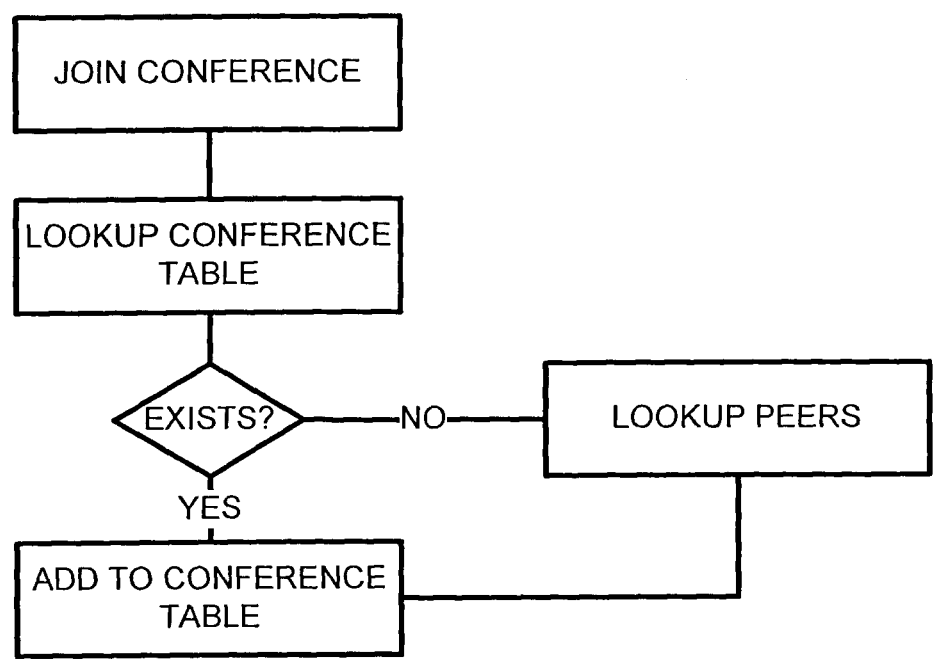
FIG. 18 shows a simplified sequence diagram of an intercom session join process.
Figure 19:
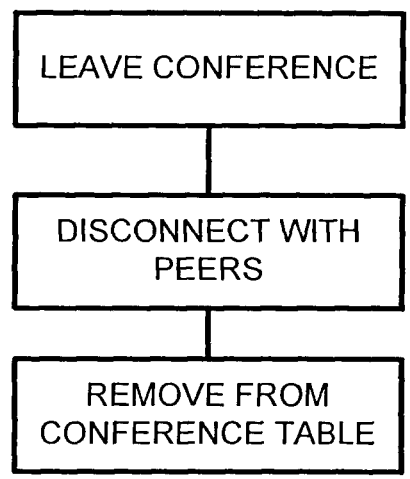
FIG. 19 shows a simplified sequence diagram of an intercom session leave process.
Figure 20:
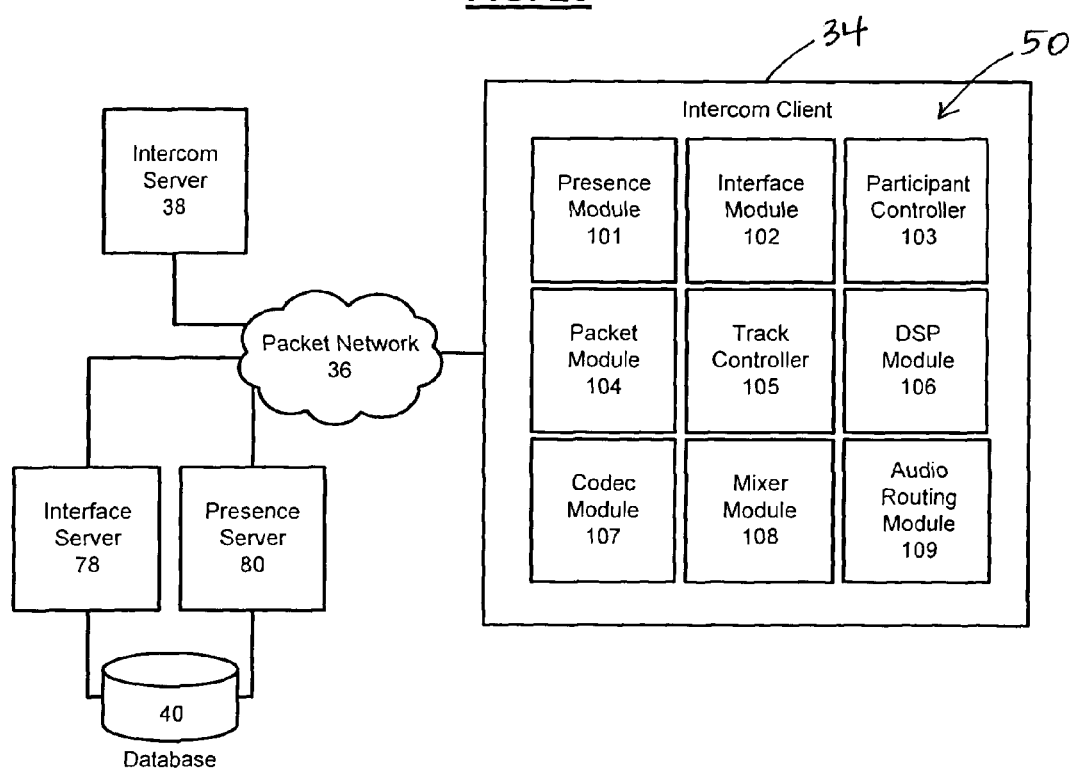
FIG. 20 shows a schematic view of an intercom system, with modules of an exemplary intercom terminal application.
Figure 21:
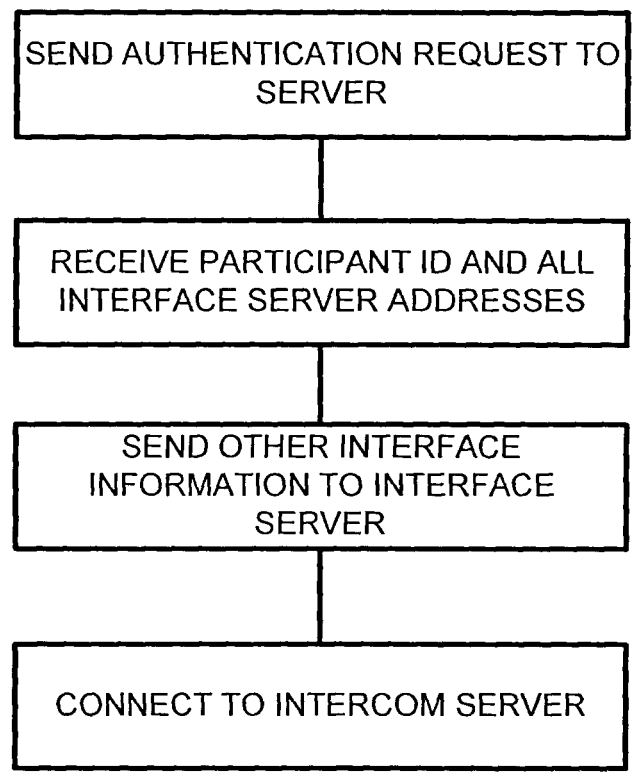
FIG. 21 shows a simplified sequence diagram of an authentication process at an intercom terminal.
Figure 22:
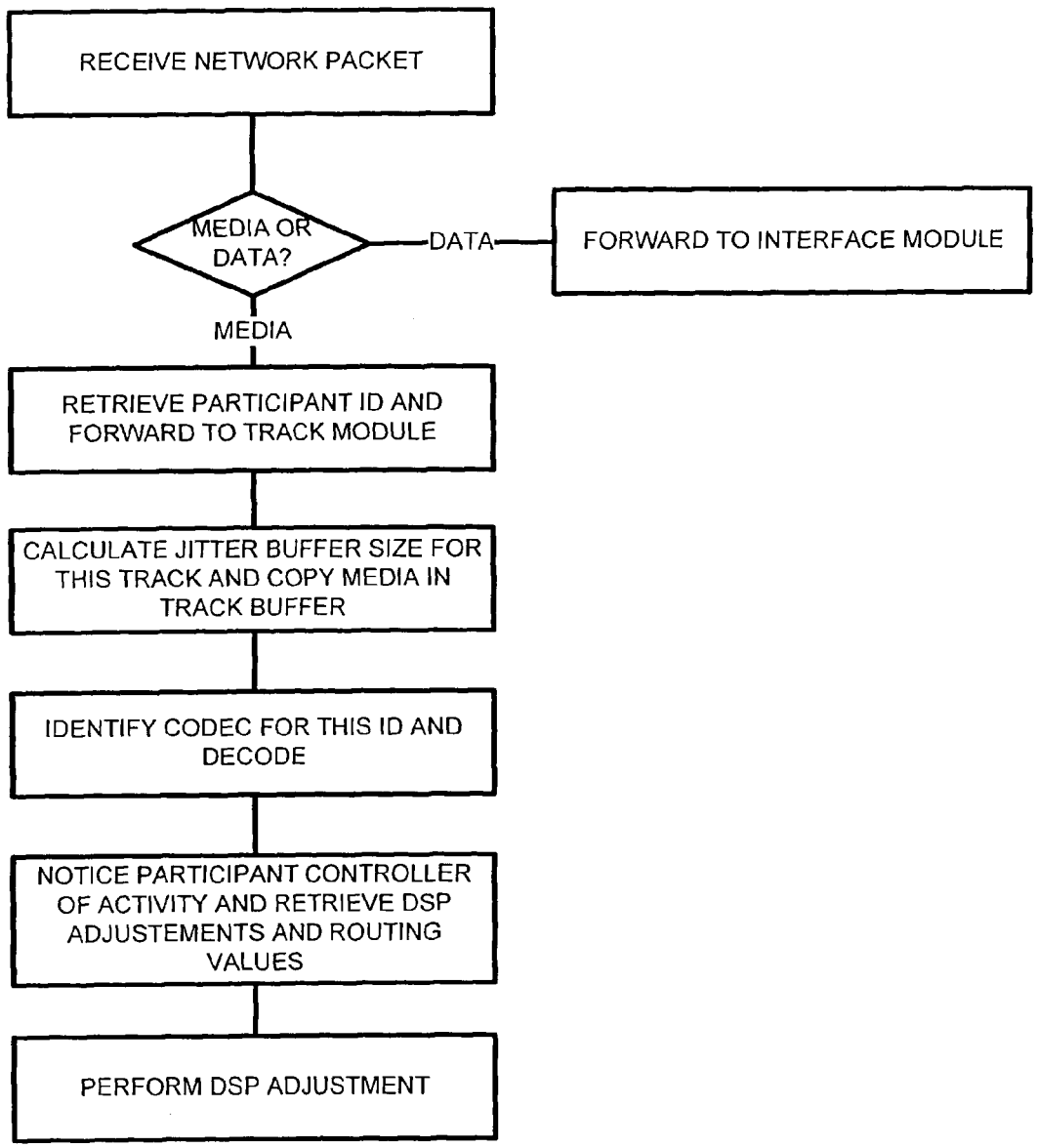
FIG. 22 shows a simplified sequence diagram of a media or packet reception at an intercom terminal.
Figure 23:
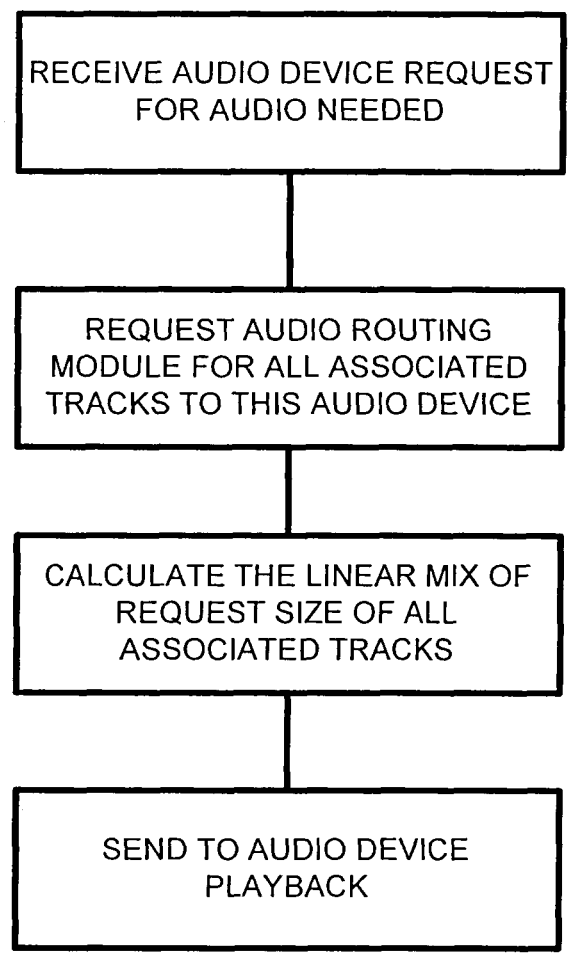
FIG. 23 shows a simplified sequence diagram of an emission of an audio signal at an intercom terminal.
Figure 24:
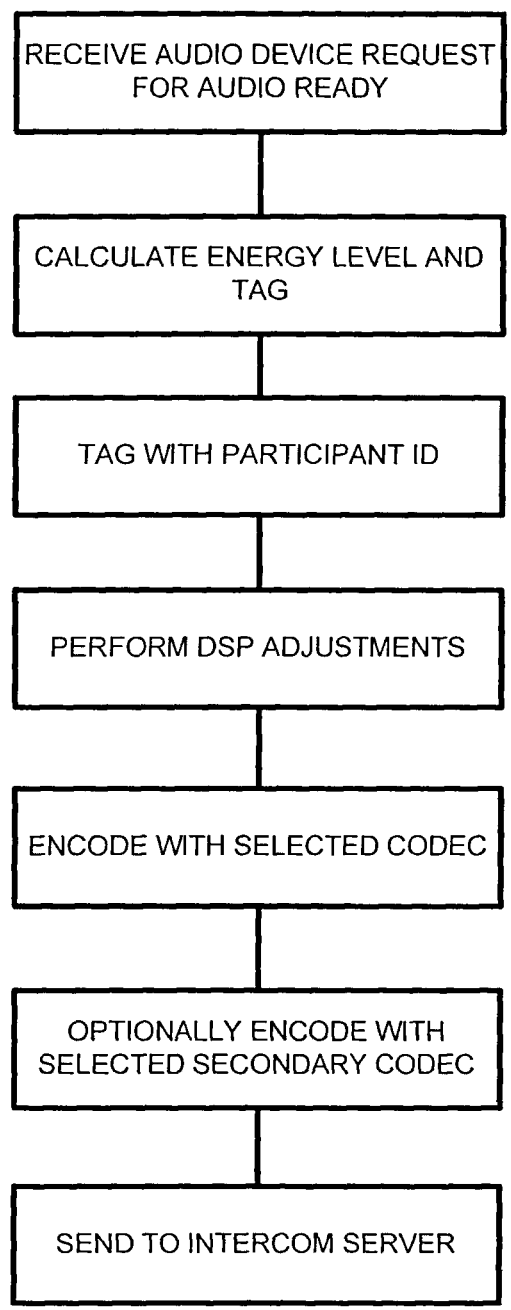
FIG. 24 shows a simplified sequence diagram of a transmission of an audio packet from an intercom terminal.

As specifically seen in FIGS. 18 and 19, the intercom server 38 may receive a conference join request an intercom terminal 34 and query the intercom session 40 table to see if this session 42 exists on this intercom server 38. If it doesn't exist, the intercom server 38 will query all intercom server peers 38 of the intercom system 30. It will then establish peer connection to the first intercom server peer 38 that answers, if any. Optionally, the intercom server 38 can query other services such as a user rights database before granting access to an intercom session 42. Then, the intercom server 38 will add the requesting participant to the intercom session(s) 42 via the intercom session table 40.

The intercom server 38 may also send an intercom session 42 join acknowledge to participant. It may also receive a conference leave request, remove a participant from an intercom session 42 and if it is the last user participating to the intercom session 42 on this intercom server 38, it may disconnect peer connections. It may also send leave acknowledge to intercom terminals 34.

To recapitulate, the method performed at the intercom server for receiving, processing, and sending unmixed audio packets involves the following steps:
  a) receiving unmixed audio packets during a given period of time, each of the unmixed audio packets having audio data and a header, said header comprising an intercom terminal identifier corresponding to an intercom terminal of the intercom system and an intensity signal representative of an intensity of the audio data contained in the corresponding unmixed audio packet;
  b) upon reception of each of the unmixed audio packets of step a), identifying from an intercom session table at least one intercom session in which said intercom terminal of said packet is registered as a talker intercom terminal;
  c) identifying for each of said at least one intercom session identified in step b), listening intercom terminals according to the intercom session table; and
  d) for each of the listening intercom terminals identified in step c), sending those of said unmixed audio packets of step a) having the strongest intensity signals to said listening intercom terminal, up to a predetermined number of unmixed audio packets.

Preferably, the given period of time is from 1 ms to 250 ms. Still preferably, the given period of time and the predetermined time interval are equal. Preferably, the given period of time occurs prior the beginning of the step of sending some of the unmixed packets 32 to listening intercom terminals 34. Preferably, the number of predetermined unmixed audio packets sent is from 3 to 7.

Preferably, the header 62 of the unmixed audio packet 32 received can be provided with a priority indicator representative of a priority associated with said unmixed audio packet 32, and wherein the step of sending the unmixed audio packets according to the intensity signal further comprises the step of sending those of the unmixed audio packets 32 received having the highest priority indicator to the listening intercom terminal 34 identified, up to the predetermined number of unmixed audio packets 32, the priority indicator having precedence over the intensity signal 66.

In addition, the intercom server 38 is preferably provided with means for updating the intercom session table 40 upon reception of a request for creating a new session 42, or a request for cancelling an actual session 42. Such requests may be sent by the intercom terminals 34, either to participate as a listening, talking or listening and talking intercom terminal 34 in a session 42. It may also be provided with means for updating the intercom session table 40 upon reception of a request for adding a new participant to one of the sessions, or a request for cancelling an active participant to one of the sessions. Means for updating the intercom session table may be done via the presence server 80, the conference module 202 and the connection controller module 203 from the intercom server application.

Now referring to FIGS. 7, 9A and 9B, and 20 to 23, when connected as a listening intercom terminal, the terminal 34 requires means to obtain a unique terminal identifier, means to obtain a list available intercom sessions, and means for sending a request to an intercom server to join at least one intercom session from the list of available intercom sessions, just like for a talker intercom terminal 34. Such means may still be a network device 44 and modules from the intercom terminal application 52.

For providing listening capabilities to the participant using it, the intercom terminal must further have means for detecting unmixed audio packets 32, the audio packets, as mentioned earlier, having an intercom terminal identifier associated with a participant of said at least one session, and audio data. The participant is in other words a talking intercom terminal participating to one or more sessions 42 to which the listening intercom terminal 34 is connected to. Such packets are sent by talking intercom terminals 34 via the intercom server 38.

The unmixed audio packets 32 are detected through a network device 44 and using a packet module 104, part of the intercom terminal application 52. By unmixed audio packets 32, it is understood that the packets are not pre-mixed at the server as it is done in prior art systems. Unmixed audio packets may come from a single intercom terminal 34 or from different intercom terminals 34 connected to the sessions 42 to which the listening intercom terminal 34 is listening to.

The audio data 64 may be voice, music or any other signals that is audible by human ears. The header 62 also has an intensity signal 66 representative of the intensity of the audio data 64 contained in the unmixed audio packet 32. This intensity signal 66 is not used by the listening intercom terminals 34 for converting the audio packets 32 into audio signals 56, therefore it may be considered optional for listening intercom terminals.

Once the unmixed audio packet 32 is detected, the intercom terminal 34 uses it means for distributing the audio data 64 into audio tracks 68 according to their identifier 58. Such means may be the packet module 104 and the track controller module 105, part of the intercom terminal application 52.

More specifically, for distributing the audio data 64 into audio tracks 68, the intercom terminals 34 retrieves the intercom terminal identifier 58 and the audio data 64 is forwarded to a track controller module 105, part of the intercom terminal application 52. The track controller module 105 maintains a dynamic list of tracks 68. A track represents a participant's audio stream, independent of all other participants. More specific information regarding how multiple tracks are transmitted and how corrections are made on multi-track streams is given in a later section.

The intercom terminal 34 also has means for buffering the audio data 64 of each of the audio tracks 68 distributed by the means for distributing, to ensure there is enough audio data 64 in the track 68 before mixing it with other audio data 64 of audio tracks 68 and converting it into an audio signal 56. Buffering (or "un-jittering") the audio data 64 ensures that the listening participant using the intercom terminal 34 will hear a continuous audio signal 56 and that it does not blank out. Such means may also be the track controller module 105.

In other words, each track 68 has its own jitter reducing buffer algorithm so that all sources can be independently buffered by the proper amount. For instance, if two sources are received, one from a local area network and the other from the Internet, the latter will likely have more inter packet jitter and delay than the former. Instead of calculating jitter for the worst case scenario, each source will have its own independent calculation. More details regarding the jitter calculations and how the buffer sizes are obtained is explained later in this description.

Preferably, listening intercom terminals are also provided with means for decoding the audio signal. As mentioned earlier, the audio data 64 of the unmixed audio packets 32 may have optionally been previously encoded by the talker intercom terminal. It this case, once the jitter calculations are performed by the track 68, the audio data 64 is decoded. The means for decoding may be a codec module 107, part of the intercom terminal application. If more than one copy of the audio data 64 exists in the packet 32, each copy encoded with a different encoder, the best quality codec is preferably chosen.

Preferably, intercom terminals are also provided with means for performing digital signal processing on the audio signals. In this case, the participant controller module 103 will store optional adjustments and audio routing values that could affect the audio packet received. For instance, it would be possible to store a volume adjustment value for a specific conference, fixed group or user. In the case a multi audio device terminal, it would be possible to route conference, users or fixed groups to a specific audio device 70. The track controller module 105 asks for any adjustments for this participant and forwards the audio to the DSP (Digital Signal Processing) module 106. The DSP module 106 will perform adjustment such as volume up or down, noise reduction, or other signal processing.

Still optionally, the track controller module 105 may then notify the participant controller module 103 of the audio activity for a given participant. The participant controller 103 than optionally forwards the information to a user interface 72, such as the one shown in FIG. 13, that can display participant activity. For instance, a list with all participants name could be displayed with normal fonts, and display talking participants in bold.

When the audio data 64 is buffered using the memory 46 of the intercom terminal in the form of tracks 68, the audio data 64 of each track 68 is mixed or summed. The intercom terminal 34 therefore is provided with means for summing the audio data 64 that have been buffered by the means for buffering to obtain an audio signal 56. Such means may consist of a mixing module 108 part of the intercom terminal application 52.

In other words, each audio device 70 will periodically request for new audio to be played back. Upon each periodic sequence, a request to the participant controller by the Audio Routing module 109 for all associated tracks 68 for this device is performed and then audio from each of the retrieved track is read and mixed together by the mixing module 108. The audio is finally sent to the audio device 70 for playback using an audio routing module 109 part of the intercom terminal application 52. The audio device 70, such as a computer audio card and speaker, can amplify the audio signal 56 using the audio card and emit it through a speaker.

To recapitulate, the method performed at an intercom terminal of a multi-point to multi-point intercom system and registered as a listening intercom terminal involves the following steps:

a) obtaining a unique intercom terminal identifier;
b) obtaining a list of available intercom sessions;
c) sending a request including said intercom terminal identifier to an intercom server of the intercom system to join at least one intercom session from the list of available intercom sessions;
d) detecting unmixed audio packets sent via the intercom server, each unmixed audio packet comprising:
  a header having an intercom terminal identifier associated with a participant of said at least one session; and
  audio data;

e) distributing the audio data into audio tracks according to their identifier;
f) buffering audio data of each of the audio tracks distributed in step e) during a buffering time interval; and
g) summing audio data of the tracks that have been buffered in step f) to obtain an audio signal.

Preferably, step c) of the method at the talker intercom terminal or at the listening intercom terminal further includes a step of sending an other request to the intercom server to create a new intercom session. Still preferably, step e) of the method at the listening intercom terminal further involves a step of decoding the audio data. Still preferably, step e) of the method at the listening intercom terminal further involves a step of performing digital signal processing (DSP) on the audio data.

As per the description above, it should be understood that an intercom terminal 34 may be a listening intercom terminal 34 in a first session 42, as a talking intercom terminal 34 in a second session 42, and as both a listening and talking intercom terminal 34 in a third session 42. Therefore, it is possible for an intercom terminal to perform the steps of a listening intercom terminal at the same time it is performing the steps of a talker intercom terminal. As such, a listening intercom terminal may also include means of a talking intercom terminal and vice versa. It is also possible that an intercom system be formed of an intercom server and one or more listening intercom terminals, an intercom server and one or more talking intercom terminals, and an intercom server and a mix of listening and talking intercom terminals, as described in the above description.

Figure 25:
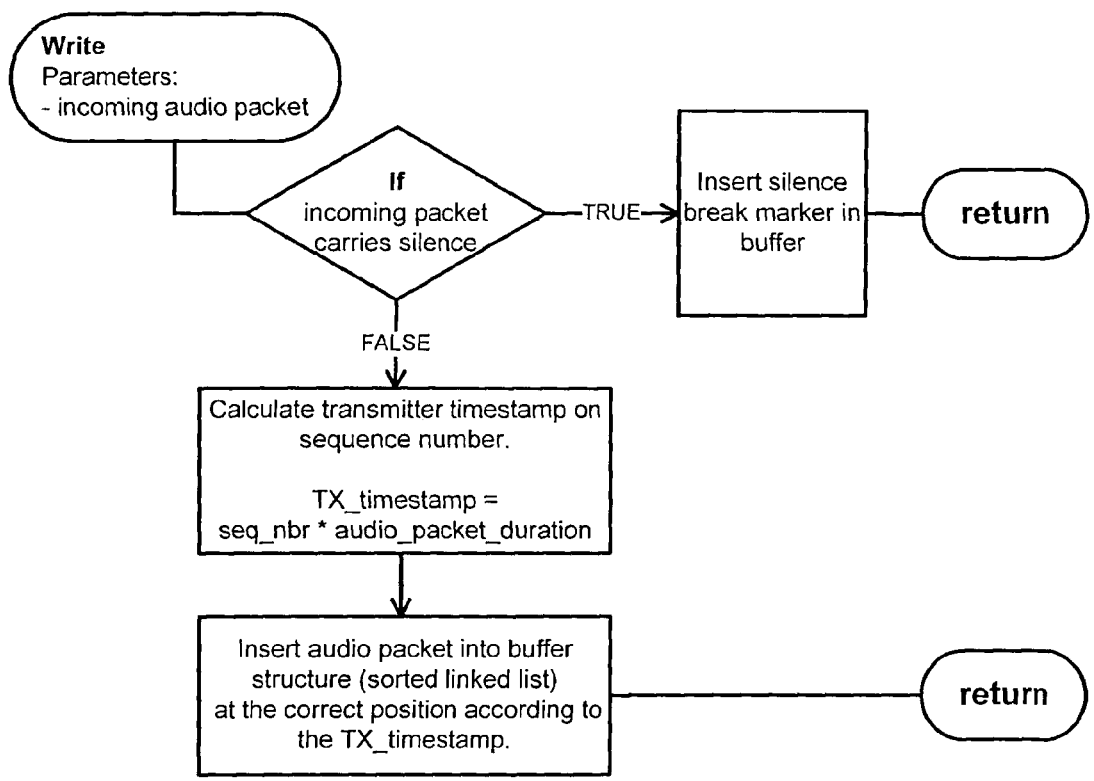
FIG. 25 shows a logical block diagram of the write sequence performed on the jitter buffer.
Figure 26:
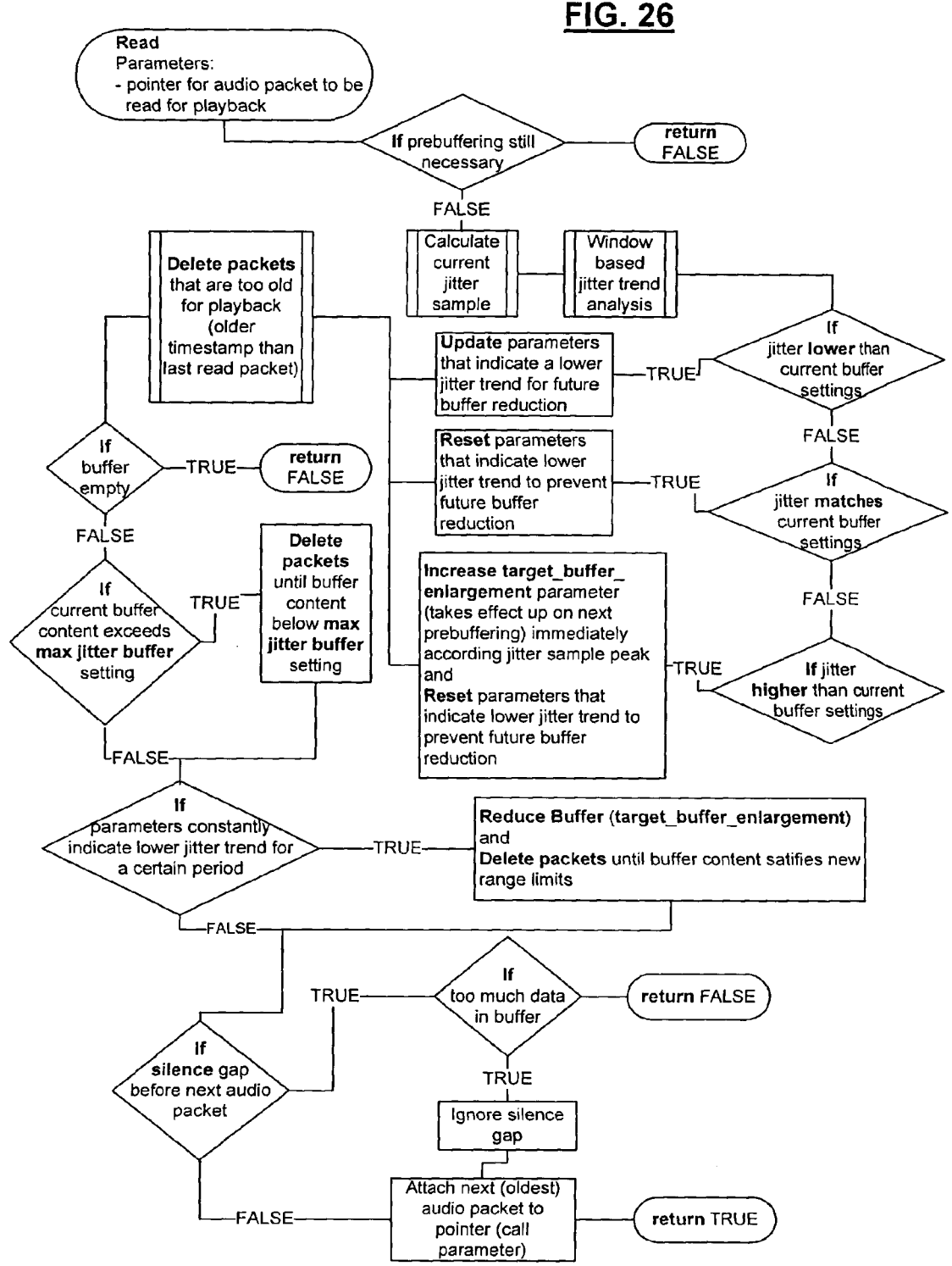
FIG. 26 shows a logical block diagram of the read sequence performed on the jitter buffer.

We will now refer to FIGS. 25 and 26 to describe the jitter and buffer size calculations and algorithms. Audio packets that are transmitted over an IP network are subject to delay on their way from the transmitter to the receiving end. Naturally the delay is not a constant value but varies for each transmitted packet within a certain range. There are certain parameters to characterize the delay behavior. The average delay is the mean delay value over all transmitted packets. A single packet's delay usually deviates from the average delay. The absolute value of a packet's delay deviation is called jitter.

Jitter Calculation

TX_buffer_interval=TX_newest_timestamp−TX_oldest_timestamp

RX_buffer_interval=RX_newest_timestamp−RX_oldest_timestamp(*)

Jitter=|TX_buffer_interval−RX_buffer_interval|

* only valid if packets have NOT arrived disordered

Of special interest is the maximum jitter value which is the absolute value of the jitter extremum that is consecutively determined within a certain window of received audio packets.

Generally jitter can be caused at several stages:
The transport medium which is an IP network including switches, routers and gateways can cause hardly predictable delay and delay deviations.
A transmitter that is not based on a real time system usually causes delay deviations since it does not have a precise timing mechanism. It uses a "target time" algorithm in order to guarantee a correct average bitrate whereas the point in time when a single packet is transmitted is likely to deviate from the nominal value.
On the receiving end a busy system and a receiver thread with a low priority can cause further delay deviations.

As described above, packets arrive at the receiving end with an individually diverging delay whereas the playback processing consumes the audio packets precisely at a certain frequency. In situations a packet arrives with a larger delay compared to the mean delay value, the playback processing may run out of data which causes noticeable degradation in audio quality. This effect can even worsen especially in case the preceding packets arrived less delayed than the average delay.

In order to compensate the jitter of an audio stream the packets are buffered up in a queue before being played back. The number of packets kept in the queue has to correspond with the detected jitter. If the queue is too short the playback process may run out of data whenever packets extremely deviate. For real time audio applications it is also of great interest to still keep the queue as short as possible to only add the maximum of delay necessary.

The worst case that has to be covered is a packet arriving the maximum jitter too late compared to the average delay after preceding packets have been arriving the maximum jitter too early. This constellation causes a playback time gap of twice the maximum jitter value. Hence the amount of audio playback time kept in the queue has to cover at least this period of time in order to prevent from audio quality degradation.

Mechanism

The inconstantly delayed arriving audio packets are buffered up into a queue structure before being passed to the playback processing. In order to correct disordered packet arrival the actual structure in use is rather a sorted list than a pure FIFO structure where the packets can be inserted at the right position. In the following the term queue or buffer is used.

The content of the adaptive jitter buffer is controlled by several parameters that are either predefined or adjustable according to the jitter situation that has been analyzed within a certain window. This window has a predefined length (in number of packets or playback time) and is sliding forward with each incoming packet. The window represents a certain interval to observe jitter trends and to accordingly adjust the jitter buffer's parameters as well as its content.

The queue length is the audio playback duration in time units resulting from the number of packets currently contained in the queue multiplied by a single packet's playback duration.

The minimum jitter buffer is a predefined value specifying the non-variable amount of audio time prebuffered prior to playback start. This is the non-adaptive part of the jitter buffer. It can be a useful setting if the network is known to always cause inconstant delay on packets. In this case the fixed minimum jitter buffer value can be set to compensate these deviations and the adaptive part between the minimum and the maximum jitter buffer is used to compensate unexpected deviation effects.

The predefined maximum jitter buffer is the absolute maximum amount of audio playback time allowed to be buffered in the queue. The maximum jitter buffer includes both, the fixed as well as the adaptive part of the buffer. This parameter even sets the limit in case the detected maximum jitter indicates the need of more data to be buffered. The interval between the minimum and the maximum jitter buffer in fact defines the size of the adaptive buffer part.

The target buffer enlargement is a calculated nominal value referring the variable amount of audio playback time buffered on top of the minimum jitter buffer without exceeding the maximum jitter buffer. Its calculation is based on the consequent jitter analysis that is done on the received packets. The target buffer enlargement usually equals twice the maximum jitter detected in the current window.

target buffer enlargement=2*maximum jitter if (target buffer enlargement>(maximum jitter buffer−minimum jitter buffer))

target buffer enlargement=(maximum jitter buffer−minimum jitter buffer)

If the jitter samples that are consecutively calculated for every incoming packet haven't reached a certain percentage (e.g. 75%) of the formerly detected jitter extremum throughout a predefined window length, a lower jitter trend is assumed and the jitter extremum value is lowered. Hence the target buffer enlargement is adjusted in definable steps according to the trend. The buffer queue's content is shortened either by trashing packets right away or by waiting for the next silence break in the audio stream.

The buffer reduction is done carefully after observing the jitter behavior within a certain period. As soon as only one jitter sample exceeds the jitter extremum value of the current window the target buffer enlargement is increased immediately. The maximum value for the target buffer enlargement parameter is the difference of maximum jitter buffer and minimum jitter buffer.

0<=target buffer enlargement<=(maximum jitter buffer−minimum jitter buffer)

Increasing the actual buffer content according to the target buffer enlargement parameter usually happens whenever the buffer runs empty due to a silence break in the audio stream or a jitter peak that exceeds the buffers compensation capabilities. This process of refilling the buffer before "giving away" the audio packets for playback is called prebuffering.

Prebuffering is done until the complete minimum jitter buffer and half of the adaptive buffer part is filled up. The adaptive buffer limited by the target buffer enlargement parameter is only filled up to the since it is not possible to decide whether the first packets are earlier or later than the average delay. So it is a compromise to treat them as average delayed without jitter. This way there is enough room for the buffer content to adjust in either direction in between incoming packets on the one and consumed packets on the other side.

There are two basic operations processed on the jitter buffer: Write and Read

These operations can be executed by two different threads, a receiver and a processing thread. It can also only be one thread doing both sequences.

The Write sequence, as shown in FIG. 25, is picking up arriving packets (e.g. from a Socket) and inserting them into the jitter buffer. The Read sequence is reading audio data from the jitter buffer and transferring it to the playback processing.

Usually the Write sequence is processed whenever one or more new packets arrive. It mostly involves assigning a reception timestamp as well as sorting and inserting packets into the linked list based buffer structure.

The jitter analysis and buffer maintenance actions are done in the Read sequence, as shown in FIG. 26. The moment the playback processing requires the next audio packet is very important regarding the buffer status. This is the moment it matters whether there is enough audio data to be played back or not. The Read sequence is usually driven by the playback processing which is based on a precise timing.

The following sections refer to FIGS. 27 to 43 and relates to Forward Error Correction (FEC) on Multi-Track Streams
Purpose This section's purpose is to expose the enhanced potential of the Forward Error Correction (FEC) mechanism when deployed in combination with the Multi-Track transmission technology. The emerging requirements differ in some points from those of a common Single-Track transmission.

The requirements and conditions a technology has to meet heavily depend on the specific area of application. A recovery strategy's efficiency is not only determined by the type of media that is transported. Moreover the efficiency can be significantly constrained by the employed transport technology and the processing of the media data on the receiver's side.
Overlap FEC The basic idea behind the Overlap FEC code is derived from the linear (n, k) FEC codes which are described in L. Rizzo's paper about effective erasure codes. Linear (n, k) FEC codes allow loosing n−k out of n transmitted packets while still being able to recover the original information (k packets) on the receiver side.[1]

[1] see Luigi Rizzo, Effective Erasure Codes for Reliable Computer Communication Protocols, Chapter 2

The reason for designing a customized FEC code is to achieve high robustness in terms of loss bursts and still keeping delay and also bandwidth consumption at a reasonable level. One benefit of the Overlap FEC code is the economization of CPU time since it is merely based on XOR operations.

The Overlap FEC technique joins the qualities from both, a (3, 2) and a (4, 2) linear FEC configuration. The mechanism for redundancy generation is taken from the (3, 2) code, which works with simple and fast XOR operations in order to minimize calculation effort and to provide a minimum delay as well. In order to additionally increase robustness to the level of a (4, 2) code further another redundancy packet is added. This is also generated by an XOR operation applied on the second source packet of the former XOR operation and the next new source packet. This results in a kind of overlapping structure between source and redundancy packets. Ideally the redundancy data packet of two source data packets is always carried piggyback by the following source packet. Since this strategy spreads the information over a wide range in a time window and the overlapping structure allows a recursive recovery process, a high robustness against packet loss that occurs in bursts is provided. Furthermore especially for single packet losses the delay caused by the recovery process is limited to a minimum since recovery can be done immediately as soon as the next packet arrives.
Scaling Overlap FEC In order to provide even higher protection against packet loss than the base version of the Overlap FEC and to be able to scale the level of robustness according to the network's Quality of Service properties it is possible to add further redundancy layers. This enables deeper recursion when recovering. Every additional layer that is added according to the concept which is shown in FIGS. 28 and 29 allows recovering two additional packets in a consecutive series of lost packets.
Proportionalities:

(Abbreviations: Overall Bandwidth: OBW, Source Bandwidth: SBW, Bandwidth Multiplication Factor: BWM=OBW/SBW, Maximum Consecutively Losable Packets: MCL, Delay in packet duration units: DEL, actual number of consecutively lost packets: CLP)

Maximum consecutively losable packets for a given overall bandwidth:

MCL=(OBW/SBW−1)*2

Maximum consecutively losable packets for a given bandwidth multiplication factor:

MCL=(BWM−1)*2

Bandwidth consumption when requiring a certain number of maximum consecutively recoverable packets:

OBW=(½MCL+1)*SBW

Times the source bandwidth needs to be multiplied when requiring a certain number of maximum consecutively recoverable packets:

BWM=½MCL+1

Delay when consecutively loosing a certain number of packets (preconditions: CLP<=MCL):
if CLP<BWM: DEL=CLP(!!!)
if CLP>=BWM: DEL=CLP+1

Multi-Track Transmission

Purpose

The idea behind transmitting multiple media streams in parallel is to move processing tasks in conferencing or intercom systems such as mixing and jitter compensation away from the central server elements to the clients. Given today's capabilities this approach comes along with a conformable increase of bandwidth. Concerning the scalability of the whole system the economized processing effort induces substantial reduction of costs.

A voice conference server receives media streams from various clients that are talking on a conference. Its basic task is to distribute each participant's voice to all the other participants. The classic approach is based on decoding all incoming audio data streams and to provide a specific mix of all the other participants' streams to each client. Before proceeding on transmission, each client's mix has to be encoded separately.

The Multi-Track approach neither requires decoding of the received media streams nor encoding of a final mix before transmitting it to the participants. Particular streams of talking participants are selected to get routed to the other participants. This selection results in a set of streams that carry the voices of currently talking participants. Therefore the server unit only has to provide a selection algorithm that dynamically picks the significant speeches in order to forward them to the other participants. The final audio mix of these so called Tracks is done by the client after decoding each stream separately. It also has to take care of the jitter calculation and jitter compensation for each received track.

Forward Error Correction can be deployed in both cases. For the Single-Track solution it is necessary to recover lost packets from a participant's client immediately before the stream gets decoded and mixed with others. For transmission new FEC redundancy layers based on the mixed audio stream are created and loss that occurs on this connection can be recovered by the receiving client.

Figure 30:
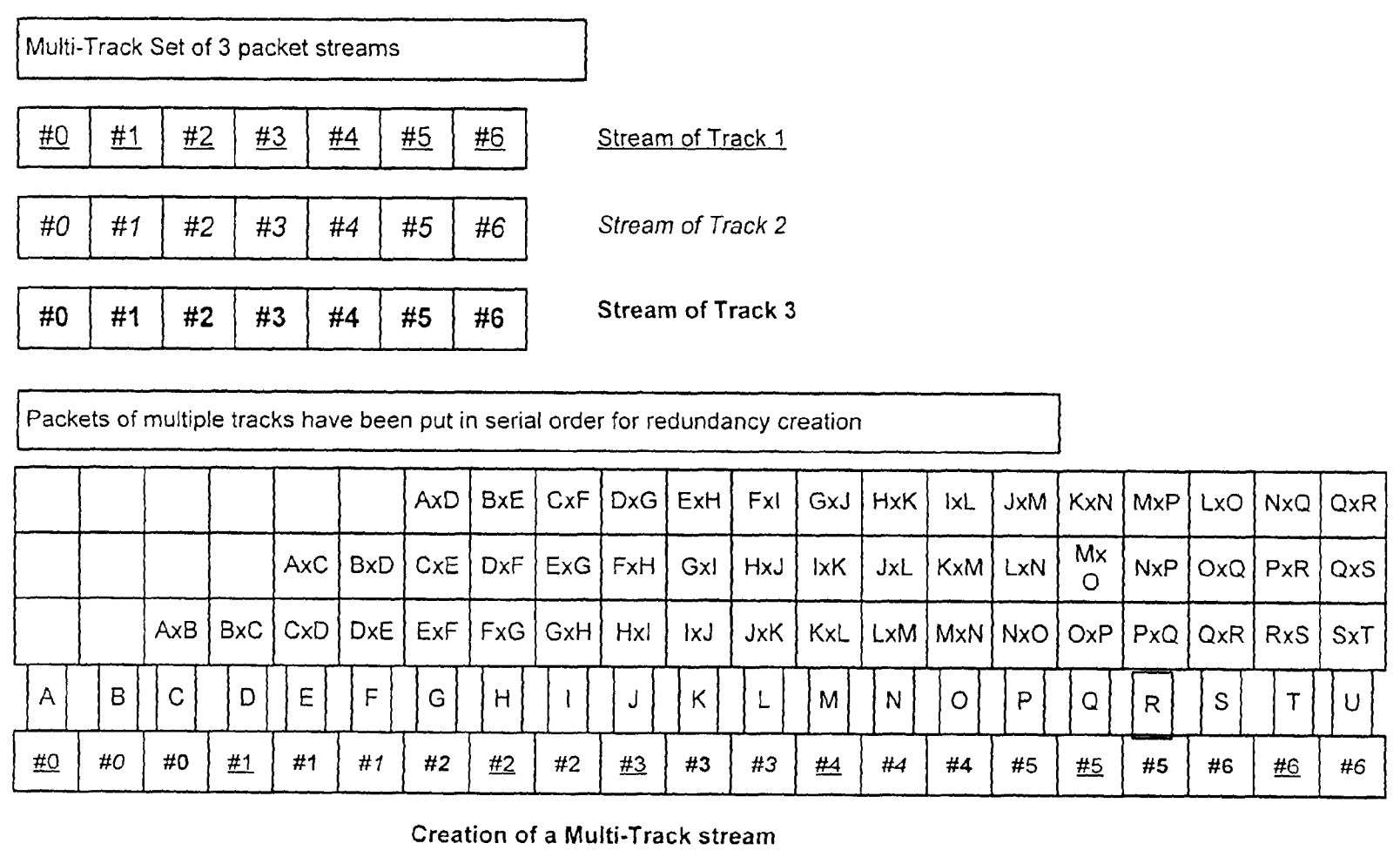

The Multi-Track approach in theory would allow not recovering the lost packets on the server and doing only separate recovery for each track on the client side. But in order to provide better loss protection, lost packets get not only recovered when finally received by the client. The server unit immediately uses redundant information that is provided by an incoming media stream from a talking participant's client. The routed set of parallel streams is treated as one stream in terms of redundancy creation. As FIG. 30 shows the packets of all parallel streams are put in sequence and consecutively carry the redundancy information for each other. In most cases the additional redundant information carried by a packet of one stream is needed to create a lost packet from another parallel stream.

This strategy results in a greater number of packets per time unit and therefore substantially affects the requirements for recovery in terms of delay. This aspect will be addressed in the subsequent sections.

Delay Requirement

Reliability, delay, calculation effort, scalability and bandwidth consumption are the determining criterions for selecting a loss protection technique. Deploying the Multi-Track technique only changes the delay constraints. By integrating the packets of n streams into a single stream we have to deal with n times more packets per time unit. It results in a similar effect as changing the playpack duration of a packet by splitting it into n packets.

Since the Overlap FEC recovery algorithm is working packet based, it is entirely independent from packet size and playback duration. Therefore n times more packets are available for recovery within the permissible delay period. These additional packets within the same period of time enable and require the deployment of enhanced recovery algorithms. These either base on a greater number of packets or allow recovering older packets—older in terms of the packets' sequence numbers within the Multi-Track stream, not older in terms of playback time. Reconstruction of such older packets makes sense in combination with Multi-Track transmission since the permissible delay will be reached after n times as many packets as in combination with the Single-Track approach.

Single-Track Recovery Strategy

Choice of Recovery Schema

Whenever a new packet comes in and packets are missing an Overlap FEC recovery implementation has to process a packet reconstruction try.

The following descriptions are based on the assumption of having less than 100 ms delay and 20 ms playback duration per packet. Thus the maximum number of usable redundancy layers is 2. For better illustration the subsequent charts demonstrate the recovery schemas based on 3 redundancy layers. In combination with Single-Track transmission this results in a recovery delay of up to 140 ms (jitter effects excluded).

2-Packet Recovery

Figure 31:
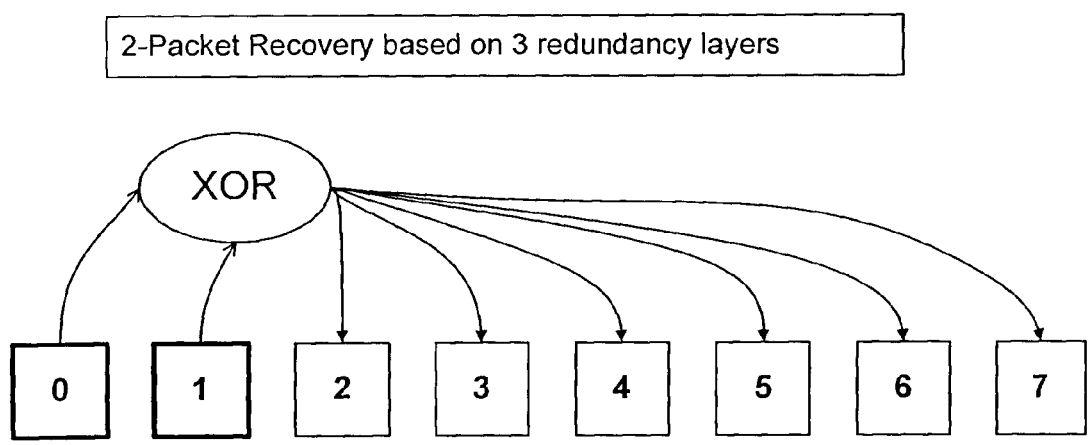
FIG. 31 shows an example of a 2-Packet Recovery for Single-Track transmissions.

Whenever the original of the second newest packet is available as well, 2-Packet Recovery as the most powerful recovery approach can be applied. The number of packets it is able to recover is up to twice the number of redundancy layers as shown in FIG. 31.

1-Packet Recovery

Figure 32:
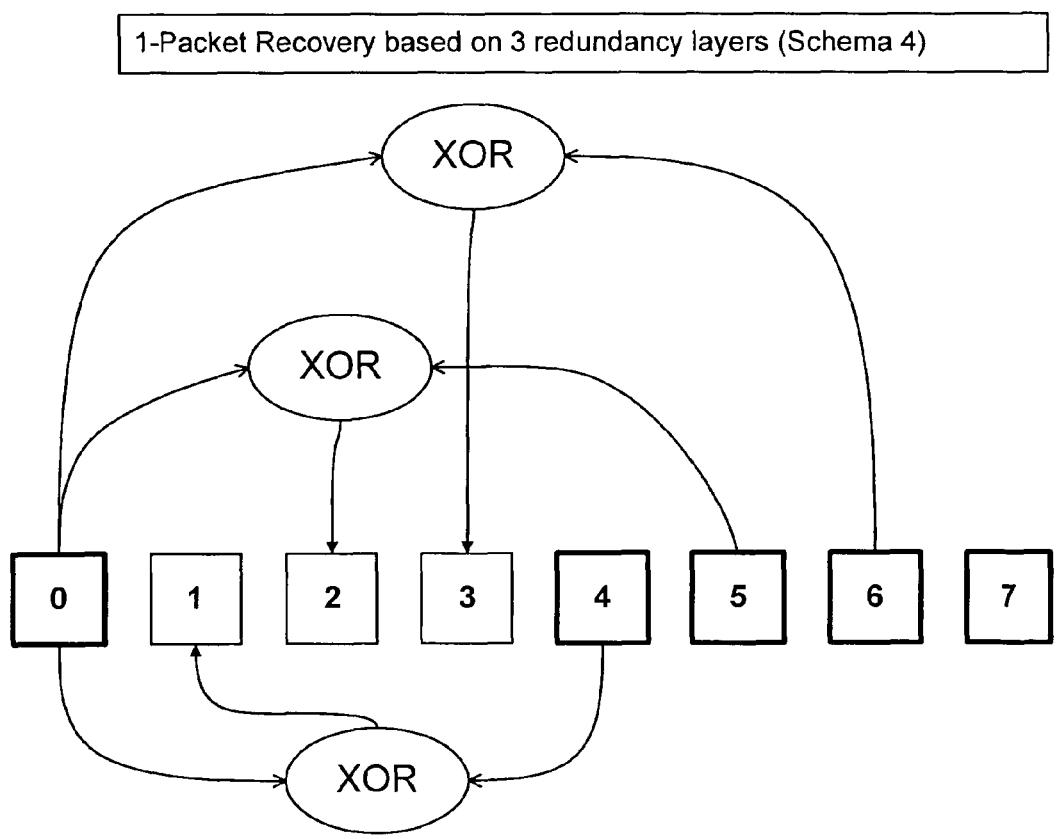
FIG. 32 shows an example of a 1-Packet Recovery for Single-Track transmissions.

If the second newest packet is not available or only a recovered version without redundancy information, packets can be recovered by the 1-Packet Recovery approach as shown in FIG. 32. This 1-Packet Recovery Schema depends on the newest available packet and on the packet with index i*2 to in order to recover the packet with index i.

Multi-Track Recovery Strategy

Since packets in Multi-Track transmission mode often get sent at almost the same time the probability they are received out of sequence by the receiver is considerably higher than in Single-Track transmission mode.

In Single-Track mode packets that are out of sequence often arrive too late to be useful for recovery concerning the permissible delay. Whereas the Multi-Track approach causes many more packets to be kept in the recovery buffer queue without exceeding the delay constraints. Therefore the recovery algorithms have to take in account the newest incoming packet to improve efficiency and recovery results. In Single-Track mode it was sufficient to be based on the newest packet in the buffer queue.

In order to show this offset based recovery approaches all the example images of the subsequent section are based on an incoming packet that has been received late. Furthermore the increased number of packets in the recovery buffer queue enables to develop further recovery schemata that make use of the additional redundancy information. The algorithms in detail are presented in subsequent section "Multi-Track Recovery Algorithms".

2-Packet Recovery

Figure 33:
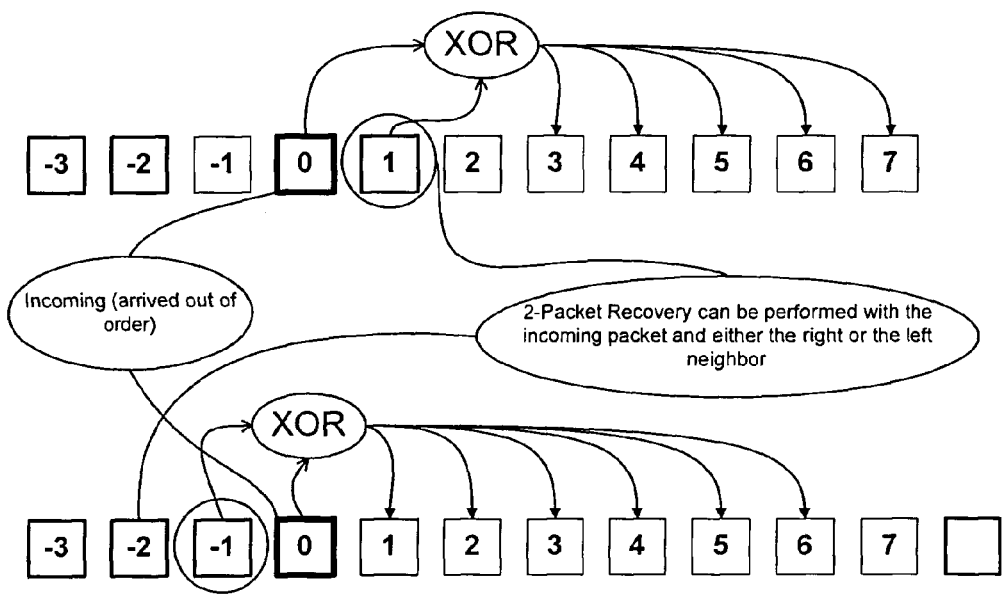
FIG. 33 shows an Offset based 2-Packet Recovery for Multi-Track transmissions.

The 2-Packet Recovery Schema is the most suitable algorithm in order to recover packets that are older than the incoming packet. It can be applied whenever the original version of either the incoming packet's left or right neighbor is available. Original version means a non-recovered packet that carries all the necessary redundancy information. In case both neighbors are available, the older one which is represented by the right one in FIG. 33 is preferred since recovery depth covers one additional packet. The maximum recovery capability is twice the number of redundancy layers. The algorithm in detail is explained in later section.

If 2-Packet Recovery can be applied, 1-Packet Recovery Schema 2-4 as described in the subsequent sections are dispensable since they also recover packets that are older than the incoming but do not reach the same recovery depth.

After 2-Packet Recovery has been performed, 1-Packet Recovery Schema 1 has to be processed to be able to reconstruct information that is newer than the incoming packet. The section about the entire recovery processing gives an overview about the decisions which reconstruction schema has to be applied.

1-Packet Recovery—Schema 4

Figure 34:
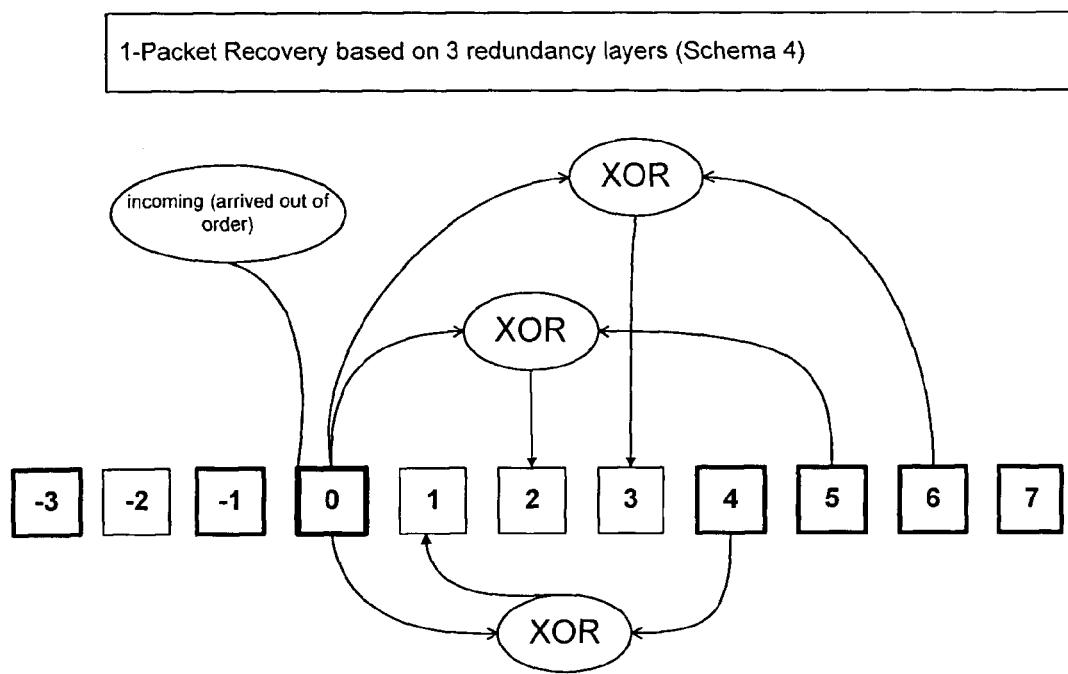
FIG. 34 shows an Offset based 1-Packet Recovery Schema 4.

The basic version of this recovery schema, as shown in FIG. 34, has already been applied for Single-Track transmissions. The Multi-Track implementation now makes use of the information about the incoming packet's position. This algorithm is presented in FIG. 40.

1-Packet Recovery—Schema 3

Figure 35:
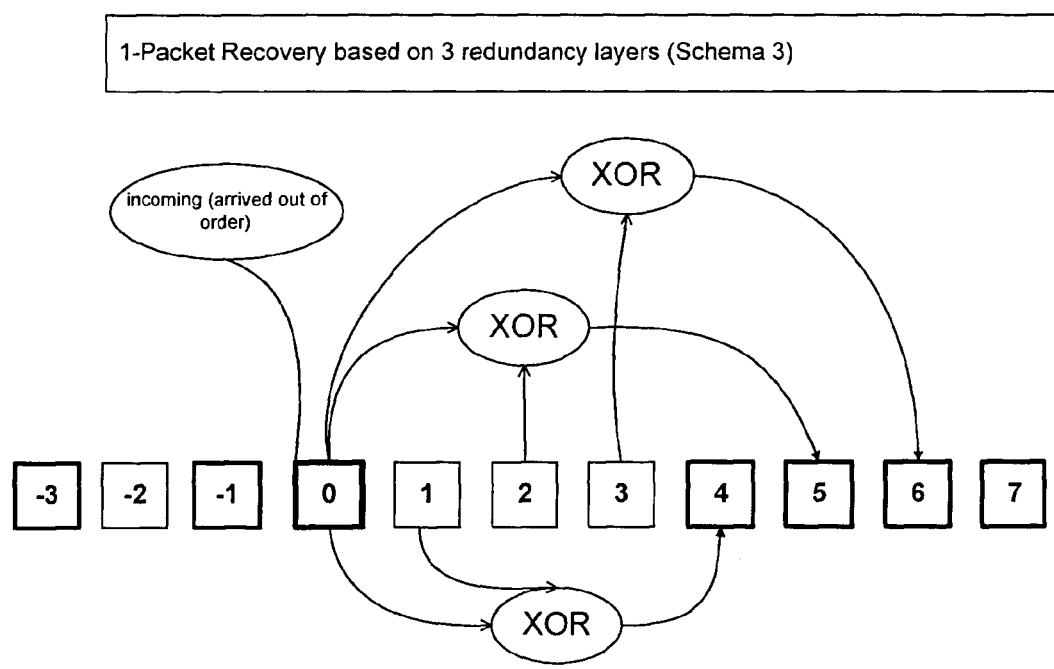
FIG. 35 shows an Offset based 1-Packet Recovery Schema 3.
Figure 36:
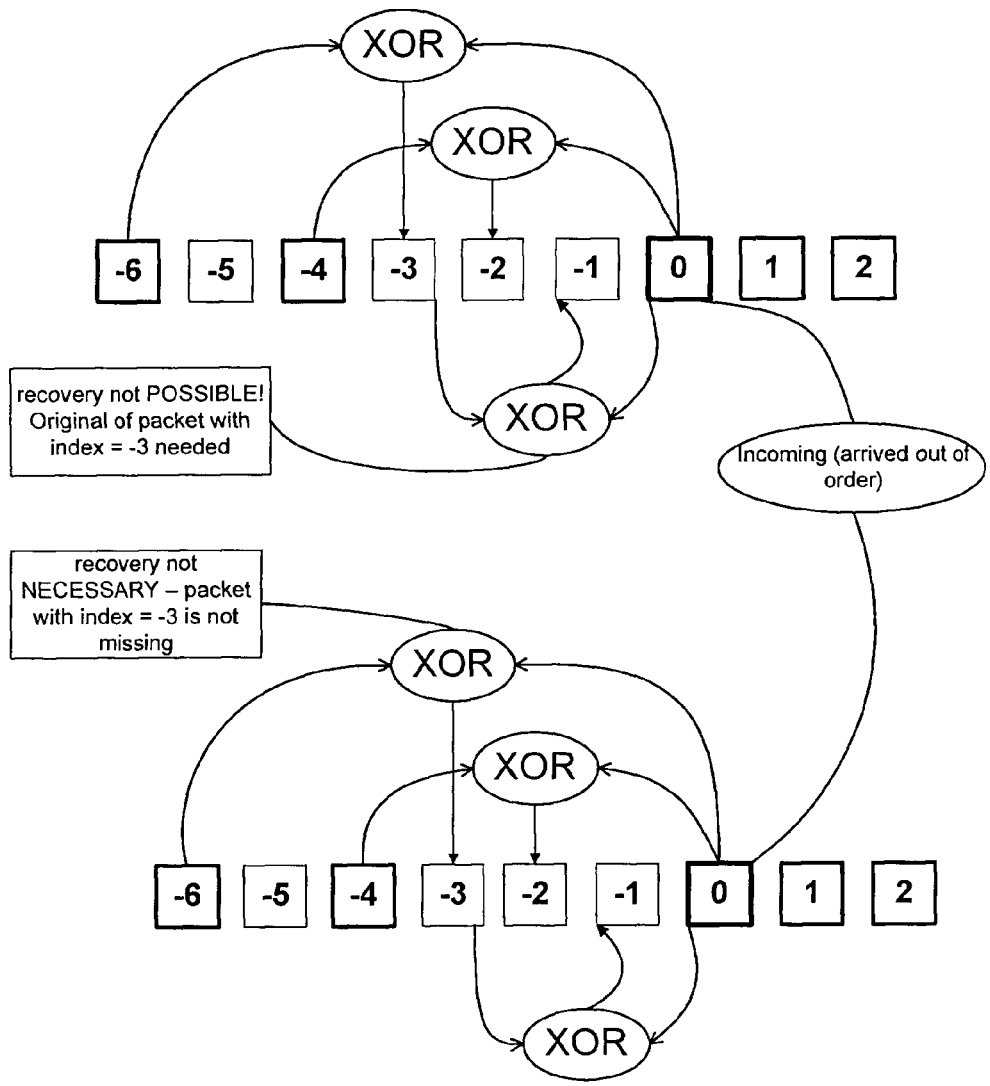
FIG. 36 shows an Offset based 1-Packet Recovery Schema 1.
Figure 37:
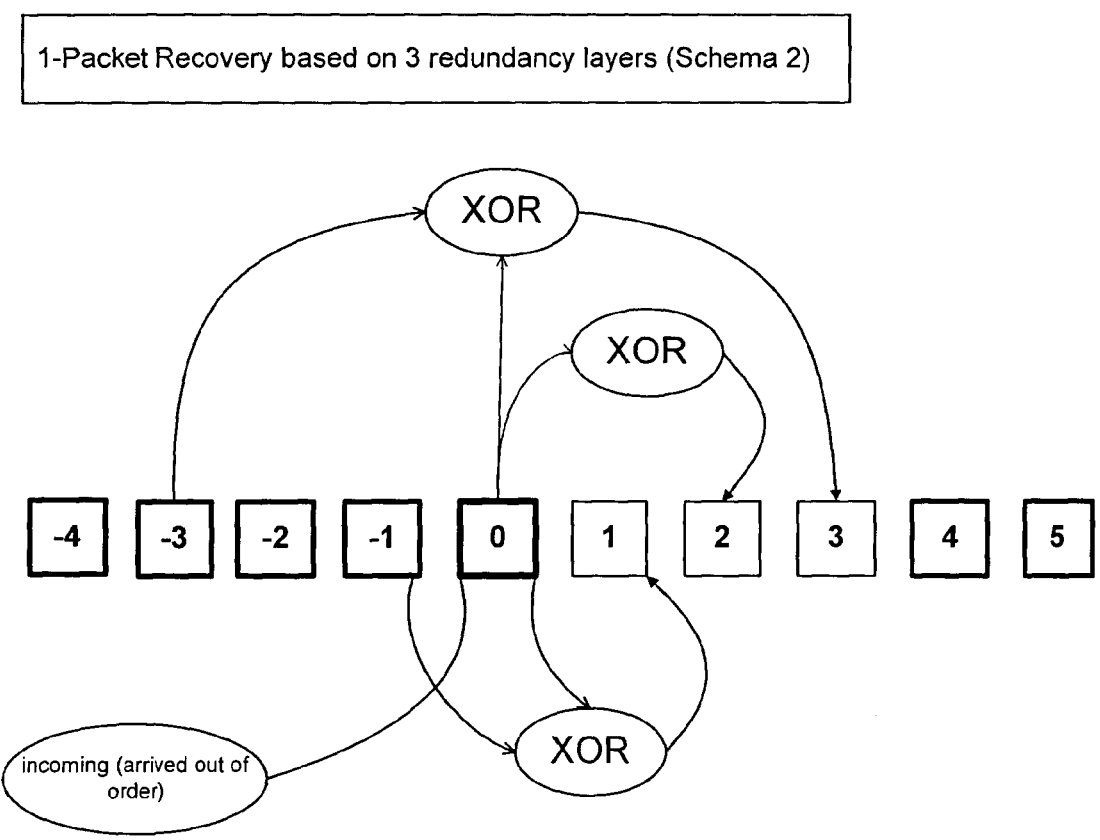
FIG. 37 shows an Offset based 1-Packet Recovery Schema 2.
Figure 38:
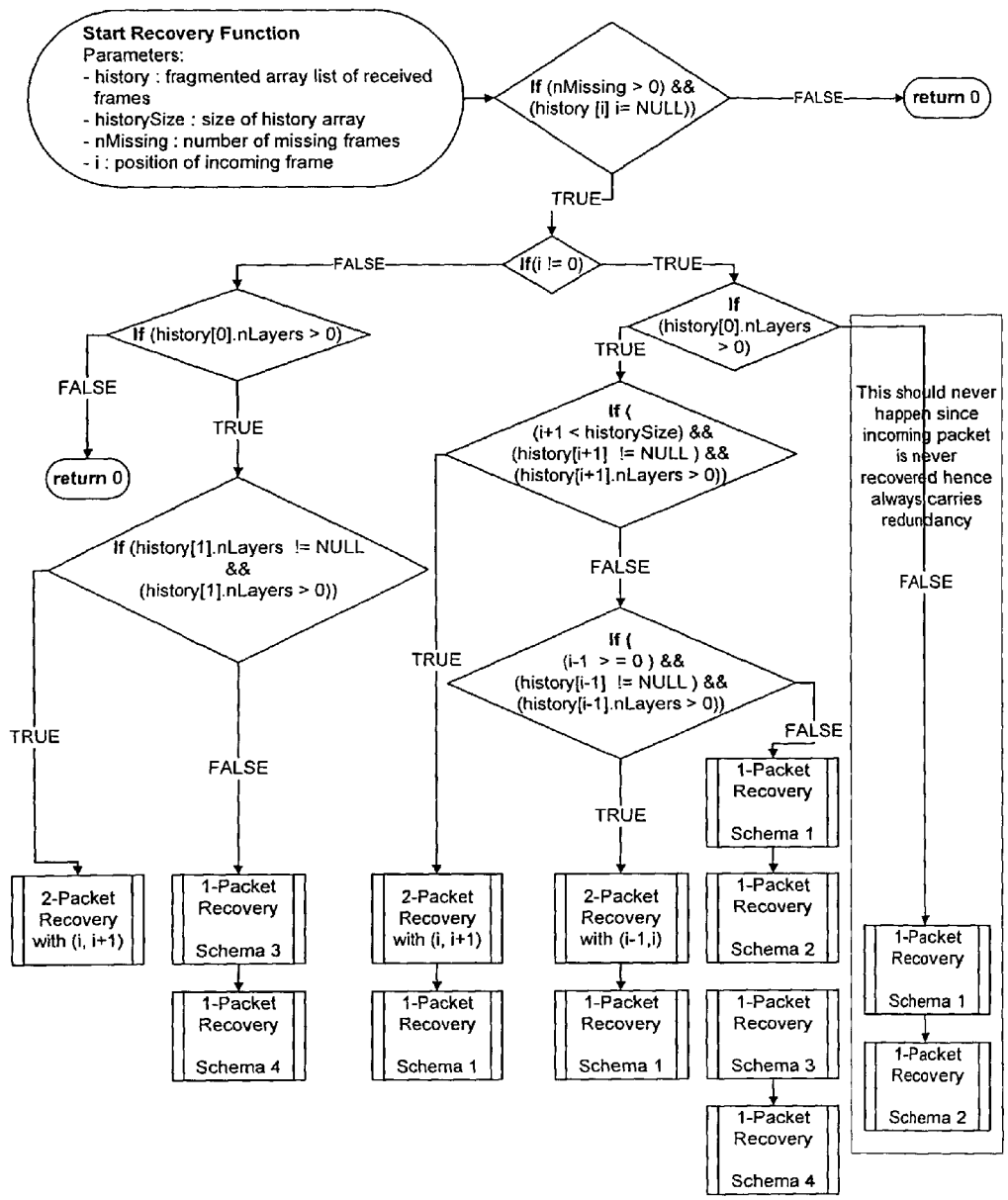
FIG. 38 shows a recovery process example for choosing appropriate reconstruction algorithm.
Figure 39:
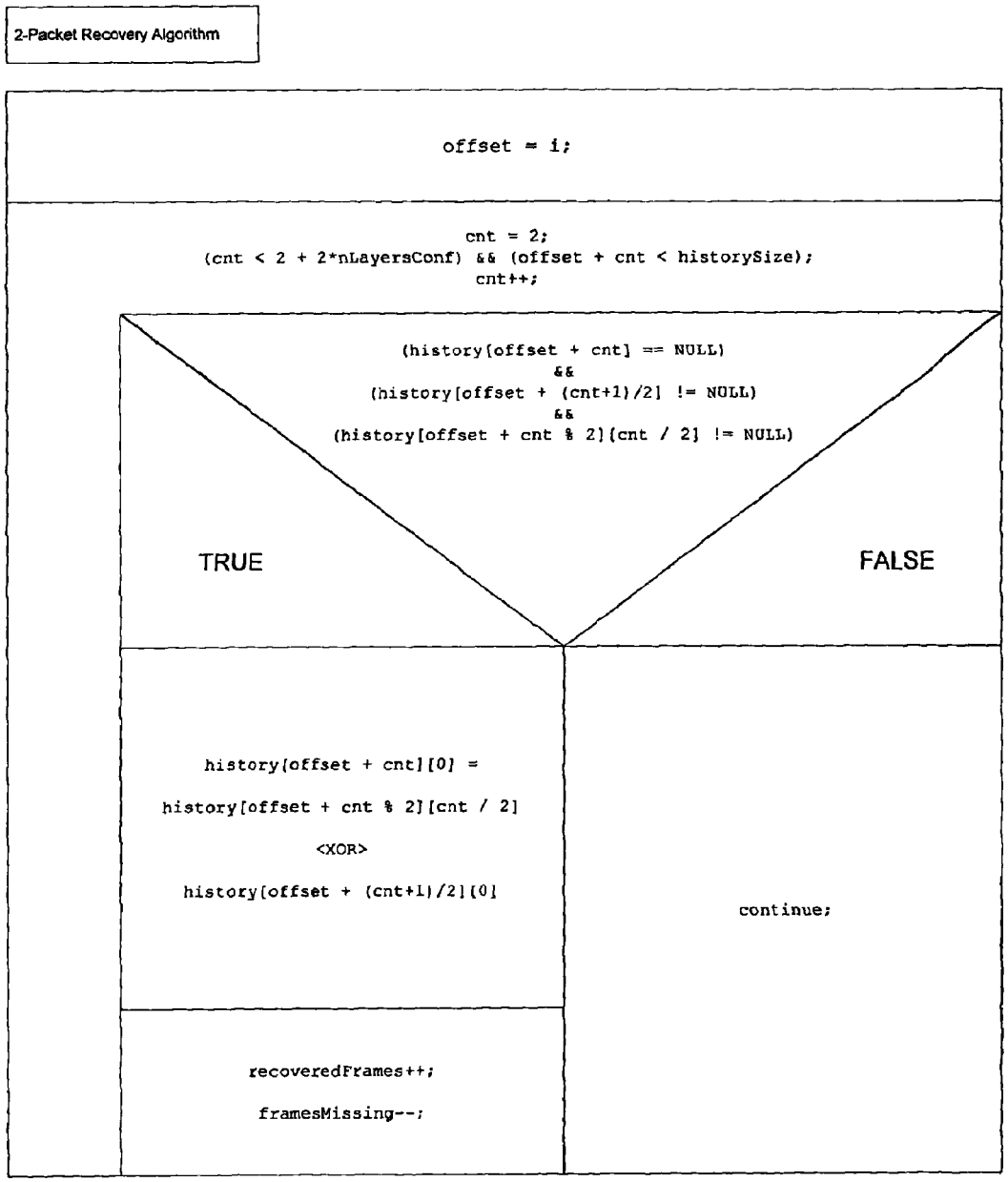
FIG. 39 shows a 2-Packet recovery algorithm.
Figure 40:
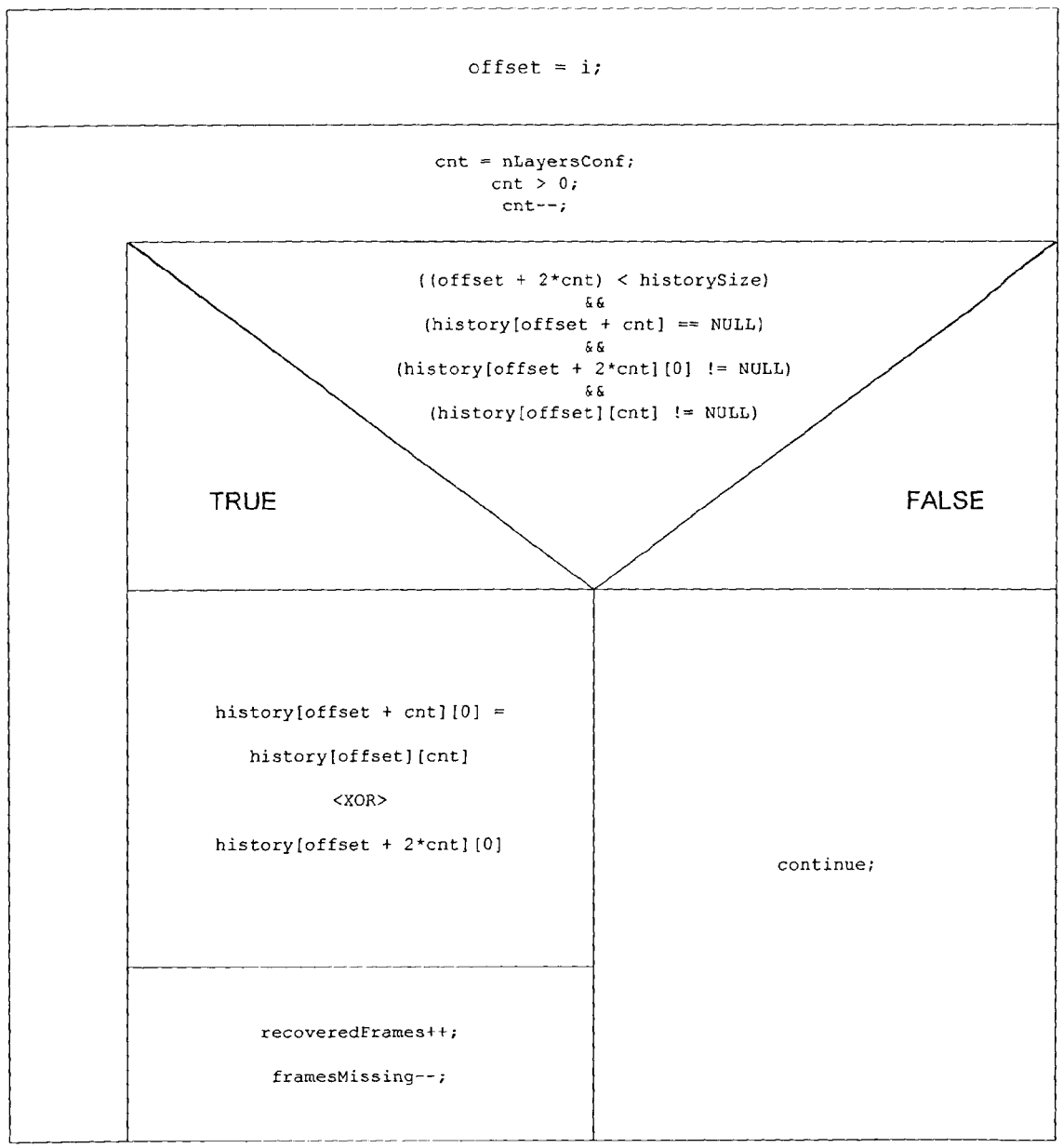
FIG. 40 shows an Offset based 2-Packet recovery algorithm, Algorithm of 1-Packet Recovery Schema 4.
Figure 41:
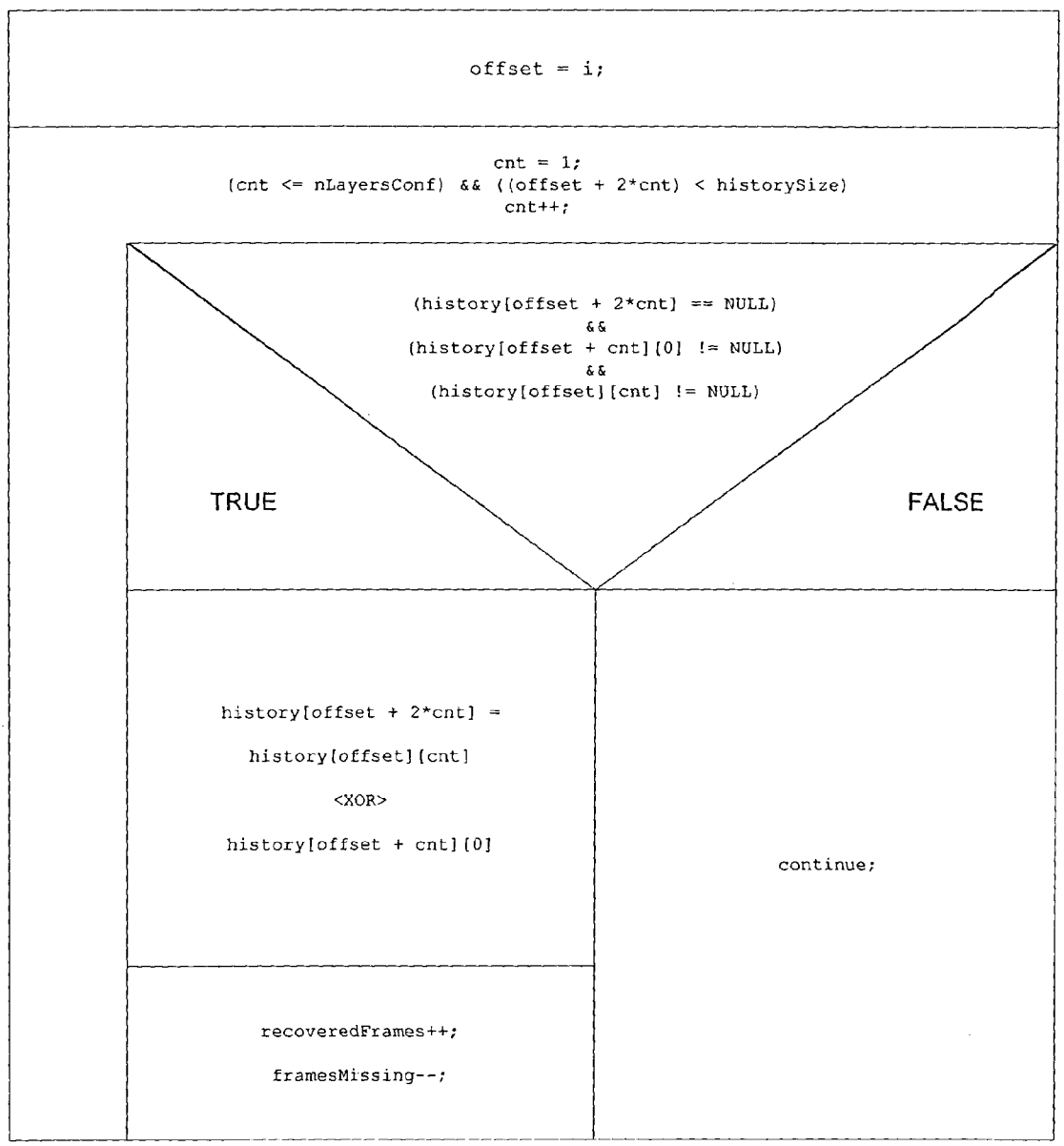
FIG. 41 shows an Offset based 1-Packet Schema 4 recovery algorithm, Algorithm of 1-Packet Recovery Schema 3.

Schema 3, shown in FIG. 35, works exactly the inverse way of Schema 4. This algorithm is presented in FIG. 41.

1-Packet Recovery—Schema 1

This recovery schema enables to recover packets that are newer than the incoming packet. The Schema 1 algorithm does not use the redundancy information of the incoming packet. It requires the incoming packet's source section and newer packets' redundancy information to recover other missing packets that are newer than the incoming in terms of the FEC sequence. Therefore it does not make a difference in which direction the reconstruction is processed since a recovered packet cannot be used to recover another packet because it does not carry the required redundancy information as shown in the two scenarios illustrated by FIG. 36. This algorithm is presented in FIG. 42.

1-Packet Recovery—Schema 2

This recovery schema makes uses newer packets than the incoming to reconstruct older packets. Such as schema 1, shown in FIG. 37, it does not use the redundancy layers of the incoming packet but those of the newer packets which need to be available as originals. This algorithm is presented in FIG. 42.

Multi-Track Recovery Algorithms

Data Structures and Parameter

Referring to FIGS. 38 to 43, the subsequent paragraphs describe the algorithmic details of the various recovery schemata in flow charts or structograms that are applied for Multi-Track transmissions. Therefore it is necessary do declare and explain all of the deployed structures and parameters.

history: This is considered as a 2-dimensional structure which stores all received and recovered packets including their redundancy layers. The newest packet is kept on position 0 of the $1^{st}$ dimension, the oldest packet in terms of FEC sequence numbering is located on the last position. Packets that have neither been received nor been recovered appear as gaps that are represented by NULL references.

Dimension-2 maintains the packet's data layers. Position 0 of the $2^{nd}$ dimension keeps the source data, the actual media data. All Positions above store the additional redundancy information starting from position 1 for redundancy layer 1 up to the highest redundancy layer. In case of recovered packets which do not carry redundancy information Position 1 and higher are not available.

historySize: This variable stores the size of the history structure's $1^{st}$ dimension.

history[x].nLayers: It stores the number of redundancy layers of a packet at position x.

nMissing: This variable stores the number of missing frames in the history structure. The ones that have neither been received nor been recovered.

i: This variable stores the position of the incoming packet in the history structure.

SUMMARY

Whether the Multi-Track approach and the corresponding recovery enhancements improve the loss compensation is not discussed in the following paragraphs. Assuming a constant loss rate and a stable part of loss bursts the recovery rate of lost packets increases.

But in fact it is not unlikely that transmitting multiple packets instead of only one per time unit increases the loss probability as well as the probability of having bursty loss. The final answer depends on the network conditions and capacities.

In the extreme case that loss probability proportionally increases more than the recovery enhancements are able to compensate it might even make sense to develop a piggyback solution for Multi-Track transmission. This would reduce the number of packets per time unit but also make most of the enhancements useless.

Instant Voice (IV™) Technology

The present invention enables to provide Real-Time Intercom and Conferencing application solutions for any wired or wireless packet networks. An object of the invention is to provide the technology to business partners, network operators, device manufacturers, application developers and service providers who are looking to accelerate time to market of high quality, reliable, secure and presence-based Intercom and conferencing or intercom solutions to their market segment.

The present invention relies on unique Instant Voice (IV™) technology capabilities and expertise gained in IP intercom and conferencing solutions in highly demanding environments such as space mission communications. The competencies encompass hardware, firmware and software integration, as well as software and protocol development. The technology edge is made possible through innovative protocols, firmware and software. The embedded IV technology provides a sustainable competitive advantage with the ability to support dynamic intercom and voice multi-conference capabilities, in a secure manner.

According to the present invention (herein referred to also as "VoiceSESS"), there is provided an innovative VoIP broadcast quality intercom system that relies on software and protocol, and does not depend on traditional VoIP codecs and connection protocol. The VoiceSESS standalone product, or embedded technology solution, supports Wideband and ultra Wideband codecs, and relies on a developed proprietary error-correcting algorithm that enables enhanced sound quality and high-fidelity audio. The technology also enables the removal of the jitter buffers which provides very low packet delay while keeping the bandwidth very low.

VoiceSESS is an ad-hoc intercom and voice conferencing solution operating over its Instant Voice (IV) network: a secure presence-based instant voice conferencing and collaboration solution, that may be available as a standalone product or as an OEM embedded technology to strategic partners. The solution is designed to operate over any Internet connected and packet network device, wired or wireless.

The VoiceSESS solution enables any users to instantly and securely create or join into a multi party conference or intercom voice session, over an IP device such as a PC or PDA, without the need to pick up a phone or a mobile radio, and connect into a conference bridge or a voice session. The technology allows users to monitor the availability of other users through presence, similar to Instant Messengers (IM). The solution's objective is to enable any user in an audio conference to dynamically add new user, while providing a high audio quality in. It is designed to be a low-cost, high-quality, secure and easy-to-use intercom and instant voice conferencing and collaboration application that is simple and quick to deploy, and can be integrated with other applications such as Outlook™, Web browsers, standalone software or embedded within Wi-Fi phones or other communication panels.

Indeed, the present invention aims at offering a secure and on-demand presence-based instant voice conferencing and collaboration solution over our Instant Voice network. The components of the Instant Voice Network (IV-N) are IV Routers (IV-R) and IV Clients (IV-C). The present invention is specifically designed to provide the highest levels of security and IT administrator control for corporations, organizations, social networks and command & control. The VoiceSESS on-demand conferencing and collaboration solution is designed using voice routing technology which provides quality and capacity in multi-peer group communications, as will be explained in greater detail hereinbelow.

VoiceSESS is designed to be a real time multi conferencing and collaboration solution, which can be managed by IT administrators if so desired. This approach provides complete enterprise control on how features are used and setup. More importantly, it provides IT administrators with a secure and non-intrusive solution, which they can monitor and manage.

The technology behind this capability is the Instant Voice Router (IV-R), which is included or linked to in the Intercom Server described above. Upon login, each end-user connection is terminated to a bridge, called Instant Voice Bridge (IV-B) on a voice router somewhere on the network acting as a private peer. All IV-Bs have the capacity to route incoming audio to any other IV-Bs instantly, even if the IV-B is located on another IV-R. Every time an end-user communicates with another end-user, the system routes the audio from one IV-B to the other if both users are associated to it, or between two different IV-Rs if not. The same logic applies for a conference call, with the system routing multiple audio streams over multiple IV-Rs and creating a single conference. The IV-Rs are located in strategic locations to concentrate local users together and mesh the routers globally. The technology that enables IV-Rs to communicate with each other is called IV Protocol (IV-P). A single IV-R can support a large volume of IV Client connections, providing for a cost-efficient network. The routing concept rather than mixing brings the delay through IV-Rs very small. Low router delay coupled with IV-P boosts the efficiency model even further by linking each IV-R with one another using algorithms for least cost routing, creating a scalable communication's architecture. The protocol enables IV-Rs to communicate or "peer" between each other at the hosted private-peer node, on a one-to-one or one-to-many basis.

The client-server component of the network is the link between the end-user and the network itself. Upon login, a virtual channel based on the IV-P is established between an IV-R (server) and the end-user IV-C and will remain active and fixed for the entire duration of the login period. The IV-Rs terminates the link on an IV-B, a sort of end-user voice mirror securely transported into the private peer-to-multi-peer network. The IV-B also provides network wide presence of the end-user making it available for instant access. The portion of packets exchanged between the end-user and the IV-R is the segment that is generally transported over the public Internet, which demands special care to optimize quality and security.

In regards to the Instant Voice Router (IV-R), the IV-R is the voice engine behind VoiceSESS' conferencing and collaboration real time intercom capabilities. It acts as a super node for audio and presence routing. In an IV network, each end-user is associated to a router via a unique IV-B. Rather than creating a call session between participants via a central conference bridge, the IV-R routes incoming audio for all IV-Bs to any other local or remote IV-Bs on the network, which allows for dynamic calling capabilities such as instant calls and instantly adding users to a call or conference. The router's technology edge lies within VoiceSESS firmware. The firmware is a real-time voice routing fabric providing multicast routes of all incoming audio simultaneously to any outgoing audio streams. What the firmware does uniquely from traditional communication systems and conference bridges is the fact it can route audio rather than switch it, which makes VoiceSESS' dynamic and instant voice capabilities possible. This efficiency translates into instant voice communications, multi-conference capabilities, as well as improving end-user performance, security and features. More importantly, it provides VoiceSESS with an important operating advantage, as it requires less network infrastructure operating over low cost devices, than any other solution.

In regards to the peer-to-multi-peer voice routing, rather than creating a static point in a conference bridge where participants meet, VoiceSESS is based on an approach through which each subscriber is a bridge in itself, or what we refer to as an Instant Voice Bridge (IV-B). The virtual location of each user on the network is known all times by all other users whom have it as a contact. This "presence" awareness allows connections to be made instantly. As opposed to switched circuitry, in order for one participant to receive another participant's audio, a simple route entry is required on its IV-B. As soon as the route entry is added to the routing table, the requested audio will immediately start flowing to the requester in parallel to any other IV-B requesting the same audio. The reverse is also true, if a route entry is removed from the IV-B, the requested audio will automatically stop flowing to that IV-B, but continue flowing towards any other IV-B requesting that same audio stream.

The IV-Protocol (IV-P) is also equipped with an address resolution mechanism allowing instant linking of IV-Rs when two IV-Bs are not located on the same physical router. As soon as a route entry for a non-local IV-B is added to a routing table, the IV-R will resolve the location of the missing IV-B and establish a route automatically. If the audio is already linked to more than one IV-R, a resolution mechanism will pick the least cost route based on delay and connection load. A route between two (2) IV-Rs that is no longer used will be automatically removed when no longer used.

This approach of voice routing versus switching enables end-users to not only instantly connect to others, but also allows for new features such as adding virtually an unlimited number of parties mid call or creating "instant voice chains", access to predefined conference rooms or voicecasts, and parallel calls or "whispers" which enable participants to whisper privately to another participant without interrupting other participants. Tagging packets in such a routing environment also allows each voice recipient to be aware of the people's presence on the conference, as well as the real time view of the current speaker.

In regards to the Instant Voice Protocol (IV-P), it is an element behind the IV-N's innovative capabilities which permits voice to be routed rather than switched. IV-P allows for a secure connection between an end-user and a hosted IV-R—the private peer. IV-P is designed to optimize full duplex speech and has a built-in proprietary loss packet reconstruction and also has a least cost routing algorithm to link multiple IV-Rs together. Although optimized for voice, the protocol is of course capable of routing data such as presence and text. The IV-P uses a single UDP port for all communications greatly facilitating firewall and NAT traversal and is also capable of sending in parallel real-time payloads and guaranteed delivery payloads. The IV Protocol is capable of "linking" voice routers between each other.

The IV-Client is an application entirely written in C++ compatible with all major operating systems such as Windows, Linux, Mac OS X, QNX and Windows Mobile. The client can be separated into four major components: a user interface (UI), and programming interface (API), a protocol stack and an authentication module. The IV Client is designed to facilitate integration within third party applications or hardware to encourage the propagation of the IV technology.

Figure 12:
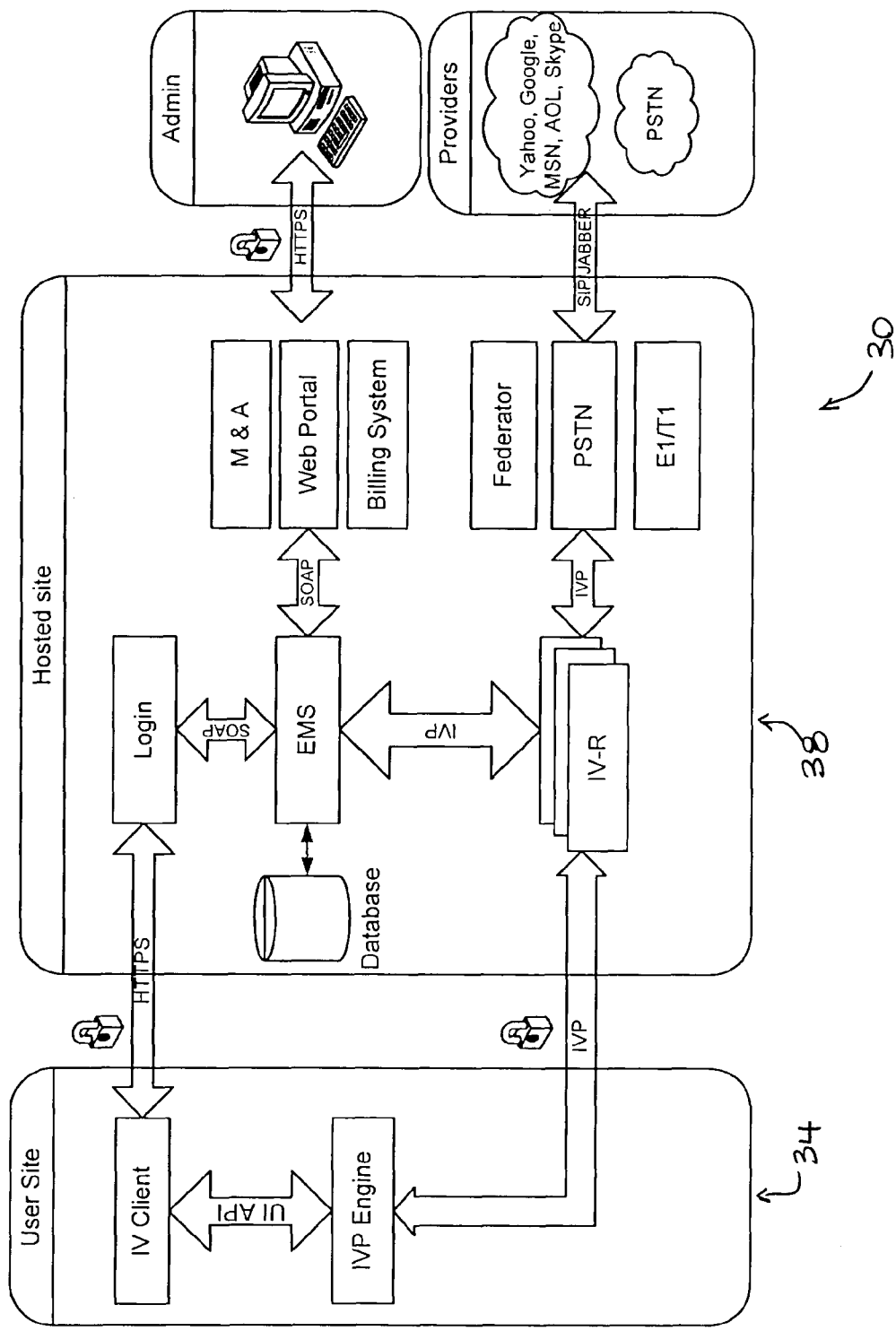
FIG. 12 shows a simplified logical block diagram of an intercom server and an intercom terminal according to an embodiment of the invention.

Reference is now made to FIG. 12, concerning the Architecture Overview. Indeed, most of today's intercom and conference bridge solutions mix participants audio centrally at the switch. Using standard IP protocol such as SIP, mixing at the switch results in long communication delays, low port count and poor audio quality, all caused by having to decompress, mix and recompress every audio packets. The present invention's innovative "Instant Voice" technology approach recognizes that the future of voice communications is based on dynamic and free flowing voice and introduces an innovative voice routing concept pushing mixing at the edge. With IV technology, intelligently selected voice packets are routed through the IV routers without the need to buffer, decompress or recompress which reduces propagation delay to nearly nothing (100 us). With a reduced processing complexity, the number of serviceable users on one router can reach multiple hundreds. Moreover, when paired with IV-P's intelligent router linking, the number of serviceable user on the system is virtually unlimited. This free flowing approach is a departure from legacy circuit-switched and analogue systems and even modern packet switched SIP based solutions that are still "influenced" by the traditional telephony heritage and limitations.

Enterprise security is achieved by ensuring that all packets sent to and from the network are fully encrypted, whether it is voice, signalling or text. The portion of packets exchanged between the IV-C and the IV-R is the segment that is generally transported over the public Internet demanding special care to optimize quality and security. To access the network, each IV-C uses an SSL encrypted connection where credentials can be exchange in all privacy. If valid credentials are provided, and according to a preferred embodiment, a 128 bit encryption key is returned to the IV-C to establish an AES encrypted IV-P connection terminated on the IV-R acting as the private peer. The IV-P connection will remain active, fixed and secure for the entire duration of the login period. Once connected, the IV-C contacts the management server directly to receive its list of contacts, keys and pre-authorized conferences or fixed groups.

The IV-Router (IV-R) associates a unique network address to each IV-C providing global presence and availability for instant access. A single IV-R can support a large volume of active connections, providing for a highly cost-efficient network. Moreover, all IV-Rs in an IV network are award of each other and can instantly link to each other to form a larger system.

The IV Protocol is equipped with a multi level recovery algorithm and a multi track jitter buffer that can handle a large number of sources in parallel. This technology is essential as it provides a company with a performance advantage over other switched VoIP conferencing and collaboration solutions in terms of cost, quality, security and performance.

According to another aspect of the present invention, and as can be easily understood by a person skilled in the art, rather than creating a static point in a conference bridge where participants meet, each connection from and edge device to a router is a bridge in itself. The virtual location of each edge device on the network is known at all times by all other edge devices who can select to monitor its presence. This "presence" awareness allows the network configuration to dynamically change and enables connections to be made instantly. As opposed to switched circuitry, in order for one participant to receive another participant's audio, a simple route entry is required on the router. As soon as the route entry is added to the routing table, the requested audio will immediately start flowing to the requester in parallel to any other user requesting the same audio. As opposed to mixing intercom or conference switches, adding new destinations for a source will add virtually no complexity and will require almost no new resources and no delay.

Intelligently selected packets are routed through the router device without the need to buffer, decompress or recompress which reduces propagation delay to nearly nothing. With a dramatically reduced processing complexity, the number of serviceable users on one router can reach multiple hundreds. Moreover, when paired intelligent router linking, the number of serviceable user on the system is virtually unlimited. This free flowing approach is a radical departure from legacy circuit-switched and analogue systems and even modern packet switched SIP, H323 or other packet based solutions that are still "influenced" by the traditional telephony heritage and limitations.

One possible use of the system is described as follow:

Router Initialization:
1. A router, using wired or wireless IP technology, establishes an intelligent connection, described later as the "intelligent connection", to the management system.
2. The management system sends to the router the IP address of all other live routers or gateways of the network.
3. The router establishes an intelligent connection to all other routers and gateways.

Establishing Connections:
1. An edge device, using wired or wireless IP technology, sends a set of credentials, composed to a minimum of user name and a password, to the management system.

The connection between the management system and the edge router should be encrypted with a public/private key mechanism such as SSL for instance to ensure complete privacy, especially if the network or part of the network is public.

2. The management system then approves or disapproves the credentials. Disapprovals terminate the connection. On approval, the management system decides which router should receive a new intelligent connection from the edge device. The decision can be based on the user identification (including but not limited to its role, company, agency, geographical location), on the routers current connection loads and any other desired useful network characteristics.

3. The management system then tells the edge device the IP address of the router it should use for its intelligent connection. It also, if desired, sends an encryption key to provide security on the intelligent connection. The same information is passed on to the router that will receive the intelligent connection.

4. The management system provides the edge device with a network address, not to be confused with the IP address, to provide a topological virtual location to the edge device on the network.

5. The edge device then establishes an intelligent connection with the identified router.

Information Gathering:

1. Once connected to the network with an intelligent connection to a router, the edge device can contact the management system directly by sending pre defined messages using the intelligent connection which the router will forward to the management system.

2. The possible information accessible to the edge device can be, but is not limited to, the network address of any or all other edge device connected, the status of the connections of the users on the other devices (such as offline or online), the list of all or some pre defined conferences or fixed group meeting point addresses, names, and current participants.

Media Connection:

1. To establish a media exchange such as a voice conversation between two or more edge devices, an edge device sends a request to the router to receive all media associated to a meeting point address.

2. The router translates the meeting point address into network addresses of all participants and adds a media route entry for each of these addresses to the edge device routing table.

3. If the edge device wishes to also provide media to the group (eg: not only monitor but also talk), the router will add the edge device's network address to the meeting point address and add a route entry to all other participants of the meeting point.

4. If the meeting point address does not exist on the router, the router will automatically ask all other routers or gateways of the network if they know about this meeting point.

5. If the meeting point address exists on one or more routers or gateway, the router will make an intelligent connection to one of them to exchange media packets of the conference or fixed group. The decision process to identify which router to use when more than one has knowledge of the meeting point address can be based on the physical location of the routers, their current loads, ping round trip, or any other parameters or combinations.

6. If the meeting point address is new, the router adds it to its tables and the edge device becomes the first participant of the conference.

Invites:

1. An edge device can ask another edge device to join a meeting point by sending an invite consisting of at least, but not limited to, a meeting point address, a source and a destination network address.

2. Upon reception of the invite, the invitee can either send a reject or an accept.

3. Upon acceptance, both edge devices will do a media connection the meeting point address exchanged as described above in media connections.

Router:

The router is the engine behind the conferencing, collaboration and intercom capabilities. The router allows digitally encoded media packets to be forwarded instantly without buffering or decoding to a very large number of edge devices. This very effective routing method translates into instant voice communications, multi-conference capabilities, as well as improving end-user performance, security and features.

The routing is based on the topological network addresses dynamically allocated at login time. All routable packets arrive from an intelligent connection terminated at the router. Routable packets consist of, but are not limited to:

1. signalling: such as invites, rejects, joins and leave;
2. data: such as text or file transfer;
3. voice: such as PCM, narrow, wide or ultra wide encode voice; and
4. video: such as MPEG2, MPEG4 or H264.

The router is not based on fixed conference bridges limiting the edge device to one conference. The router is completely reservationless and allow edge device to control their full voice experience.

Instead of doing a composite sum of the audio signals of participants, the router makes forwarding decisions using, but not limited to, tagged information embedded in the packet such as:

1. user identification;
2. network address;
3. the average signal energy of the current packet;
4. sequence;
5. latency; and
6. priority.

Each packet source address is check against each edge device, router or gateway connection's routing table. In its bandwidth reduction effort, the router can decide to not forward a packet to a particular intelligent connection if the packet is deemed to late, to weak, not important, or for any other reasons which answers network reduction for a particular connection.

The media routing versus switching enables edge devices to not only instantly connect to others, but also allows for great new features such as, but not limited to, adding virtually an unlimited number of parties mid call or creating "instant voice chains", access to predefined conference rooms or fixed groups, and parallel calls or "whispers" which enable participants to whisper privately to another participant without interrupting other participants. Tagging packets in such a routing environment also allows each voice recipient to be aware of the people's presence on the conference, allows volume control on a per user or per conference basis, provide a real time view of the current speakers, enables prioritization of participants, as well as enabling tagged recordings which will display the speaker's name during playback.

The router can have intelligent connections to other routers, which in turns may also be connected to other routers. This characteristic of the system enables the possibility of a packet to be router to more than one router before it reaches an edge device. The router does not provide packet timing and must not buffer or hold on to packets for any reasons other than for recovery. Arriving packets must be analysed instantaneously and the forwarding decision must be made and executed right away to result in the lowest possible end to end delay.

The router does not decode and encode media such as voice or video. Arriving media packets are forwarded without modification to the media data itself. This characteristic ensures that media encoding processes are done only once during the end to end process, and only at the edge device. It also allows support for many different types of media and codecs in parallel.

Edge Device:

The edge device can be any wired or wireless processor based device, such as but not limited to PC, PDA, Mobile phone, communication panels or mobile radio.

As opposed to other topologies, the system requires the edge device to perform more than simple audio capture and playback. The edge device is intelligent and is required to perform some or all of the following:

1. voice activity Detection;
2. automatic gain control to normalize all incoming audio level to a meaningful value;
3. calculate the average signal energy for every packet;
4. capture and playback analog audio samples with some or all narrowband, wideband and ultra wideband capacities;
5. encode and decode using any desired codec, such as for instance Speex or G722;
6. calculate composite sums of a plurality of incoming digital signals; and
7. encrypt and decrypt.

The edge device is typically user operated using a touch screen, push buttons, software or any other means of proving user responses.

The edge device is able, although not required, to send and receive from or to other edge devices any type of data distributed thought the routers. Such data can be text, video, voice, presence and status information, invites, contacts, keys, conferences and fixed groups.

The edge device can embed within packets sent any useful information such as user identification data, prioritization value, source and destination network address.

Intelligent Connection:

The connection between each edge device and router, router to routers as well as router to management system should have the following capabilities:

1. Ability to easy cross sub networks protected by firewalls, NAT or any other IP networking security devices.
2. Ability to encrypt the entire payload of every packet exchanged between the two connected endpoints.

The intelligent connection should support a feedback loop between the connected end points which provides adequate information for either or both endpoints to modify the connection characteristics to attempt to reach lower packet losses. For instance, if the router for U1's connection notices packet losses or unacceptable delays, it will feedback the U1 edge device which will in turn will attempt to increase its redundancy layers and/or lower its codec bandwidth by compressing more.

The connection between the edge device and the router allows full duplex speech, may be able to reconstruct loss packets and can also have least cost routing capability to link multiple routers together. It should be capable of transmitting real time media such as voice and video as well as any other data and handle jitter form a plurality of different media sources. It should use single UDP port for all communications to facilitating firewall and NAT traversal. It should also have the capability of sending in parallel real-time payloads and guaranteed delivery payloads.

Preferably, an intelligent connection is required to support recovery and redundancy as described in the Multitrack FEC section described above.

Although preferred embodiments of the present invention have been described in detail herein and illustrated in the accompanying drawings, it is to be understood that the invention is not limited to these precise embodiments and that various changes and modifications may be effected therein without departing from the scope or spirit of the present invention.

The invention claimed is:

1. A method performed at an intercom server of a multi-point to multi-point intercom system, comprising:
   a) receiving unmixed audio packets during a given period of time, each of the unmixed audio packets having audio data and a header, said header comprising an intercom terminal identifier corresponding to an intercom terminal of the intercom system and an intensity signal representative of an intensity of the audio data contained in the unmixed audio packet;
   b) upon reception of each of the unmixed audio packets of step a), identifying from an intercom session table at least one intercom session in which said intercom terminal of said packet is registered as a talker intercom terminal;
   c) identifying for each of said at least one intercom session identified in step b), listening intercom terminals according to the intercom session table; and
   d) for each of the listening intercom terminals identified in step c), sending those of said unmixed audio packets of step a) having the strongest intensity signals to said listening intercom terminal, up to a predetermined number of unmixed audio packets.

2. The method according to claim 1 further comprising the following steps that are performed at one of the listening intercom terminals:
   e) obtaining a unique intercom terminal identifier corresponding to said listening intercom terminal;
   f) obtaining a list of available intercom sessions;
   g) sending a request including said unique intercom terminal identifier to the intercom server to join at least one intercom session from the list of available intercom sessions of step f);
   h) detecting the unmixed audio packets sent via the intercom server in step d)
   i) distributing the audio data of each of the unmixed audio packets detected in step h) into audio tracks according to their intercom terminal identifier;
   j) buffering audio data distributed in step i) for each of the audio tracks; and
   k) summing audio data of the tracks that have been buffered in step j) to obtain an audio signal.

3. The method according to claim 1 wherein the given period of time is from 1 ms to 250 ms.

4. The method according to claim 1, wherein the given period of time occurs prior to the beginning of step d).

5. The method according to claim 1, wherein the predetermined number of unmixed audio packets is from 3 to 7.

6. The method according to claim 1, wherein the header further comprises a priority indicator representative of a priority associated with said unmixed audio packet, and wherein step d) further comprises the step of sending those of said unmixed audio packets of step a) having the highest priority indicator to said listening intercom terminal up to the predetermined number of unmixed audio packets, the priority indicator having precedence over the intensity signal.

7. The method according to claim 1, further comprising a step of updating the intercom session table upon reception of a request for creating a new session, or a request for cancelling an actual session.

8. The method performed according to claim 1 further comprising a step of updating the intercom session table upon reception of a request for adding a new participant to one of the sessions, or a request for cancelling an active participant to one of the sessions.

9. An intercom server of a multi-point to multi-point intercom system, comprising:
- an intercom session table linking registered intercom terminals and intercom sessions;
- means for receiving unmixed audio packets during a given period of time, each of the unmixed audio packets having audio data and a header, said header comprising an intercom terminal identifier corresponding to one of said registered intercom terminals of the intercom system and an intensity signal representative of an intensity of the audio data contained in the unmixed audio packet;
- first means for identifying from the intercom session table, upon reception of each of the unmixed audio packets received by the means for receiving, at least one of the intercom sessions in which the intercom terminal associated with said packet is registered as a talker intercom terminal;
- second means for identifying, for each of said at least one intercom session identified by the first means for identifying, intercom terminals registered as listening intercom terminals according to the intercom session table; and
- means for sending, for each of the listening intercom terminals identified by the second means for identifying, those of said unmixed audio packets received by the means for receiving having the strongest intensity signals to said listening intercom terminal, up to a predetermined number of unmixed audio packets.

10. The intercom server according to claim 9, in combination with listening intercom terminals, wherein each of the listening intercom terminals comprises:
- means to obtain a unique intercom terminal identifier corresponding to said listening intercom terminal;
- means to obtain a list of available intercom sessions;
- means for sending a request including said intercom terminal identifier, to the intercom server of the intercom system to join at least one intercom session from the list of available intercom sessions;
- means for detecting the unmixed audio packets sent via the intercom server,
- means for distributing the audio data of each of the unmixed audio data packets into audio tracks according to their intercom terminal identifier;
- means for buffering audio data of each of the audio tracks, distributed by the means for distributing; and
- means for summing audio data of the tracks that have been buffered by the means for buffering to obtain an audio signal.

* * * * *